United States Patent
Kim et al.

(10) Patent No.: US 11,632,795 B2
(45) Date of Patent: Apr. 18, 2023

(54) METHOD FOR TRANSMITTING UPLINK SIGNAL AND APPARATUS SUPPORTING METHOD IN WIRELESS COMMUNICATION SYSTEM SUPPORTING NON-LICENSED BAND

(71) Applicant: LG ELECTRONICS INC., Seoul (KR)

(72) Inventors: Seonwook Kim, Seoul (KR); Joonkui Ahn, Seoul (KR); Eunsun Kim, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 17/109,939

(22) Filed: Dec. 2, 2020

(65) Prior Publication Data
US 2021/0092768 A1    Mar. 25, 2021

Related U.S. Application Data

(63) Continuation of application No. 16/071,886, filed as application No. PCT/KR2017/000721 on Jan. 20, 2017, now Pat. No. 10,887,912.
(Continued)

(51) Int. Cl.
*H04W 74/08* (2009.01)
*H04L 5/00* (2006.01)
(Continued)

(52) U.S. Cl.
CPC ....... *H04W 74/0808* (2013.01); *H04L 5/0053* (2013.01); *H04W 72/0446* (2013.01);
(Continued)

(58) Field of Classification Search
None
See application file for complete search history.

(56) References Cited

U.S. PATENT DOCUMENTS

2011/0255460 A1    10/2011    Lohmar et al.
2015/0365830 A1    12/2015    Wei et al.
(Continued)

FOREIGN PATENT DOCUMENTS

WO    2015126783    8/2015
WO    2015191963    12/2015
(Continued)

OTHER PUBLICATIONS

Mediatek, "Uplink channel access in LAA", 3GPP TSG RAN WG1 Meeting #84, R1-160976, Feb. 2016, 11 pages.
(Continued)

*Primary Examiner* — Jutai Kao
(74) *Attorney, Agent, or Firm* — Lee Hong Degerman Kang Waimey

(57) ABSTRACT

Discloses are a method for a terminal for transmitting an uplink signal to a base station and an apparatus supporting the method in a licensed assisted access (LAA) system in which a base station or a terminal transmits listen-before-talk (LBT)-based signals. Specifically, disclosed are a method for a terminal transmitting an uplink signal by executing a particular LBT action and an apparatus supporting the method if the uplink signal is transmitted by the terminal by sharing a maximum channel occupancy time (MCOT) with a base station.

19 Claims, 22 Drawing Sheets

Related U.S. Application Data

(60) Provisional application No. 62/362,574, filed on Jul. 14, 2016, provisional application No. 62/344,394, filed on Jun. 1, 2016, provisional application No. 62/343,814, filed on May 31, 2016, provisional application No. 62/337,316, filed on May 16, 2016, provisional application No. 62/334,447, filed on May 10, 2016, provisional application No. 62/327,425, filed on Apr. 25, 2016, provisional application No. 62/303,377, filed on Mar. 4, 2016, provisional application No. 62/300,099, filed on Feb. 26, 2016, provisional application No. 62/281,153, filed on Jan. 20, 2016, provisional application No. 62/281,156, filed on Jan. 20, 2016.

(51) Int. Cl.
*H04W 72/0446* (2023.01)
*H04W 74/00* (2009.01)
*H04W 72/20* (2023.01)

(52) U.S. Cl.
CPC ......... *H04W 72/20* (2023.01); *H04W 74/002* (2013.01); *H04W 74/0816* (2013.01)

(56) References Cited

U.S. PATENT DOCUMENTS

| | | | |
|---|---|---|---|
| 2017/0245250 A1 | 8/2017 | Zhang et al. | |
| 2017/0318607 A1 | 11/2017 | Tiirola et al. | |
| 2018/0124749 A1* | 5/2018 | Park | H04L 27/0006 |
| 2018/0175975 A1 | 6/2018 | Um et al. | |
| 2018/0199369 A1 | 7/2018 | Larsson et al. | |
| 2018/0220459 A1* | 8/2018 | Park | H04W 74/00 |
| 2018/0242353 A1 | 8/2018 | Lei | |
| 2018/0288805 A1 | 10/2018 | Bhorkar et al. | |
| 2018/0352562 A1 | 12/2018 | Frederiksen et al. | |
| 2019/0342915 A1 | 11/2019 | Kim et al. | |
| 2020/0205201 A1 | 6/2020 | Noh et al. | |

FOREIGN PATENT DOCUMENTS

| | | |
|---|---|---|
| WO | 2017199205 | 11/2017 |
| WO | 2017214621 | 12/2017 |
| WO | 2018017354 | 1/2018 |

OTHER PUBLICATIONS

Ericsson, "On Coordinated UL Channel Access for Enhanced LAA", 3GPP TSG RAN WG1 Meeting #84, R1-161000, Feb. 2016, 3 pages.

Institute for Information Industry (III), "Discussion on LAA Uplink Channel Access", 3GPP TSG RAN WG1 Meeting #84, R1-160989, Feb. 2016, 3 pages.

U.S. Appl. No. 16/071,886, Notice of Allowance dated Oct. 29, 2020, 7 pages.

U.S. Appl. No. 16/071,886, Office Action dated Jul. 7, 2020, 18 pages.

U.S. Appl. No. 16/071,886, Final Office Action dated Jan. 23, 2020, 17 pages.

U.S. Appl. No. 16/071,886, Office Action dated Sep. 20, 2019, 10 pages.

European Patent Office Application Serial No. 17741701.1, Search Report dated Jun. 17, 2019, 8 pages.

Japan Patent Office Application No. 2019-129505, Office Action dated May 12, 2020, 3 pages.

Nokia Networks et al., "On LAA PUSCH scheduling and UL grant enhancements", R1-160788, 3GPP TSG RAN WG1 Meeting #84, Feb. 2016, 6 pages.

Fujitsu, "UL LBT and PUSCH Design for LAA", R1-160489, 3GPP TSG RAN WG1 Meeting #84, Feb. 2016, 6 pages.

PCT International Application No. PCT/KR2017/000721, Written Opinion of the International Searching Authority dated Apr. 24, 2017, 13 pages.

Samsung, et al., "WF on MCOT for LBT priority classes", 3GPP TSG RAN WG1 Meeting #83, R1-157670, Nov. 2015, 5 pages.

\* cited by examiner

FIG. 9
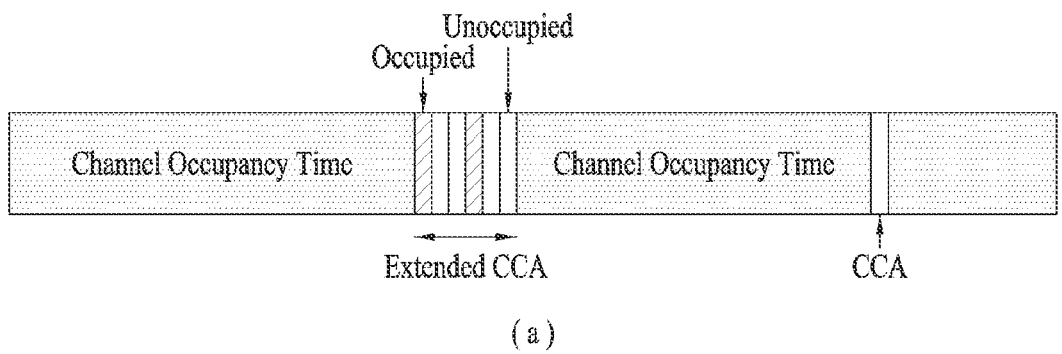
(a)
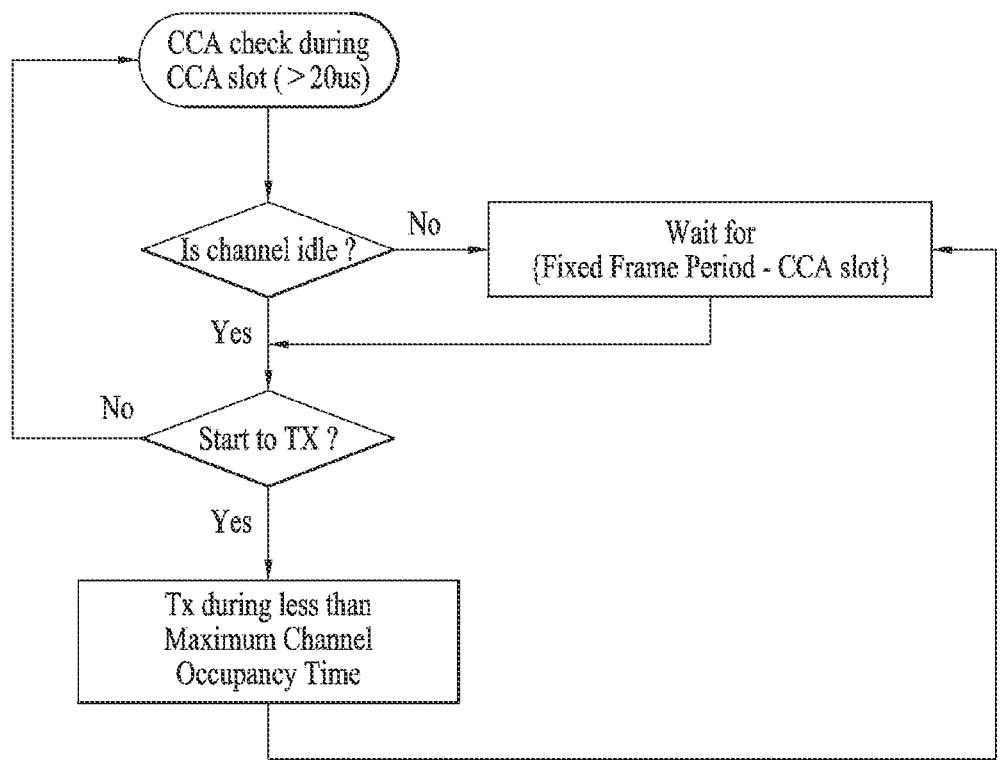
(b)

METHOD FOR TRANSMITTING UPLINK SIGNAL AND APPARATUS SUPPORTING METHOD IN WIRELESS COMMUNICATION SYSTEM SUPPORTING NON-LICENSED BAND

CROSS-REFERENCE TO RELATED APPLICATIONS

This application is a continuation of U.S. patent application Ser. No. 16/071,886, filed on Oct. 30, 2018, which is the National Stage filing under 35 U.S.C. 371 of International Application No. PCT/KR2017/000721, filed on Jan. 20, 2017, which claims the benefit of U.S. Provisional Application No. 62/281,153, filed on Jan. 20, 2016, 62/281,156, filed on Jan. 20, 2016, 62/300,099, filed on Feb. 26, 2016, 62/303,377, filed on Mar. 4, 2016, 62/327,425, filed on Apr. 25, 2016, 62/334,447, filed on May 10, 2016, 62/337,316, filed on May 16, 2016, 62/343,814, filed on May 31, 2016, 62/344,394, filed on Jun. 1, 2016, and 62/362,574, filed on Jul. 14, 2016, the contents of which are all hereby incorporated by reference herein their entirety.

TECHNICAL FIELD

Following description relates to a wireless communication system supporting an unlicensed band, and more particularly, to a method for a UE to transmit an uplink signal to a base station in a wireless communication system supporting an unlicensed band and apparatuses supporting the method.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method for a UE to transmit an uplink signal to a base station when the base station or the UE performs an LBT (listen-before-talk)-based signal transmission.

In particular, an object of the present invention is to provide a method for a UE to transmit an uplink signal to a base station when a part of MCOT (maximum channel occupancy time) secured by the base station is allocated for the uplink signal transmission.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for a UE to transmit an uplink signal to a base station in a wireless communication system supporting an unlicensed band and apparatuses supporting the method.

To achieve these and other advantages and in accordance with the purpose of the present invention, as embodied and broadly described, according to one embodiment, a method of transmitting an uplink signal, which is transmitted by a user equipment (UE) to a base station in a wireless communication system supporting an unlicensed band, includes the steps of receiving first information scheduling uplink signal transmission for one or more first subframes and indicating a first LBT (Listen-Before-Talk) type as an LBT type for the one or more first subframes from the base station, receiving second information indicating one or more second subframes included in downlink MCOT (maximum channel occupancy time) from the base station, and when the one or more first subframes are included in the one or more second subframes, performing LBT of a second LBT type other than the first LBT type in the one or more first subframes and transmitting the uplink signal based on a result of the performed LBT.

To further achieve these and other advantages and in accordance with the purpose of the present invention, according to a different embodiment, a user equipment (UE) transmitting an uplink signal to a base station in a wireless communication system supporting an unlicensed band includes a receiver, a transmitter, and a processor configured to operate in a manner of being connected with the receiver and the transmitter, the processor configured to receive first information scheduling uplink signal transmission for one or more first subframes and indicating a first LBT (Listen-Before-Talk) type as an LBT type for the one or more first subframes from the base station, the processor configured to receive second information indicating one or more second subframes included in downlink MCOT (maximum channel occupancy time) from the base station, the processor, if the one or more first subframes are included in the one or more second subframes, configured to perform LBT of a second LBT type other than the first LBT type in the one or more first subframes and transmit the uplink signal based on a result of the performed LBT.

In this case, the first LBT type corresponds to a random backoff-based LBT type attempting to perform uplink signal transmission by performing random backoff and the second LBT type may correspond to an LBT type attempting to perform uplink signal transmission when a channel is in an idle state for prescribed time.

In particular, the first LBT type may correspond to a random backoff-based LBT type attempting to perform uplink signal transmission by performing random backoff based on an LBT parameter corresponding to a class among predetermined 4 classes.

In this case, the prescribed time may correspond to 25 us.

And, the second information can include information indicating the number of the second subframes until the timing at which the downlink MCOT ends.

And, the second information can be transmitted via a common PDCCH (physical downlink control channel).

And, the uplink signal can be transmitted via an unlicensed band.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, if a UE transmits an uplink signal via a partial subframe included in MCOT secured by a base station in a wireless access system supporting an unlicensed band, it is able to more efficiently perform uplink transmission.

In particular, if a UE transmits an uplink signal within MCOT secured by a base station, the UE is able to perform uplink signal transmission via minimum channel sensing.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 9 is a diagram illustrating an exemplary Load Based Equipment (LBE) operation as one of the LBT operations;

BEST MODE

Mode for Invention

Figure 1:
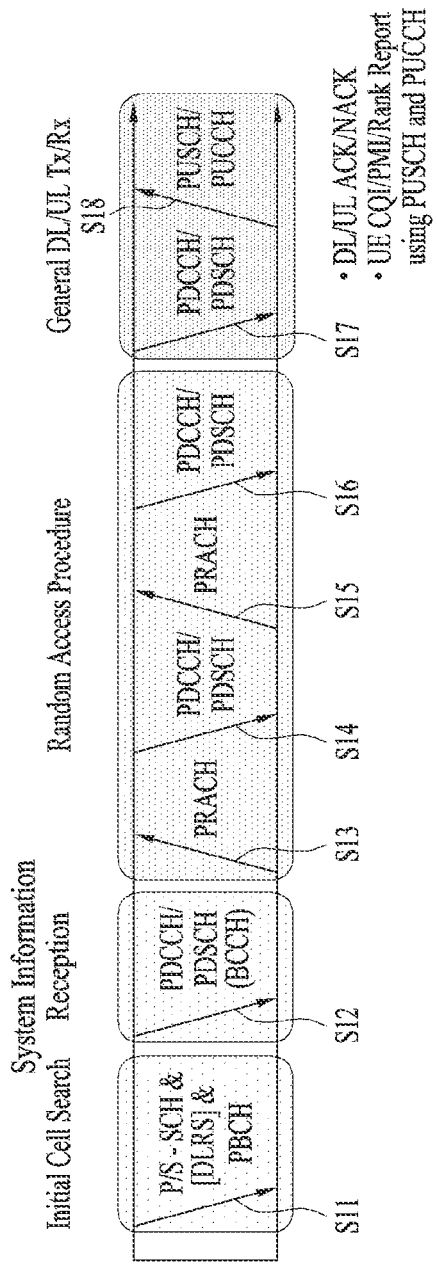
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
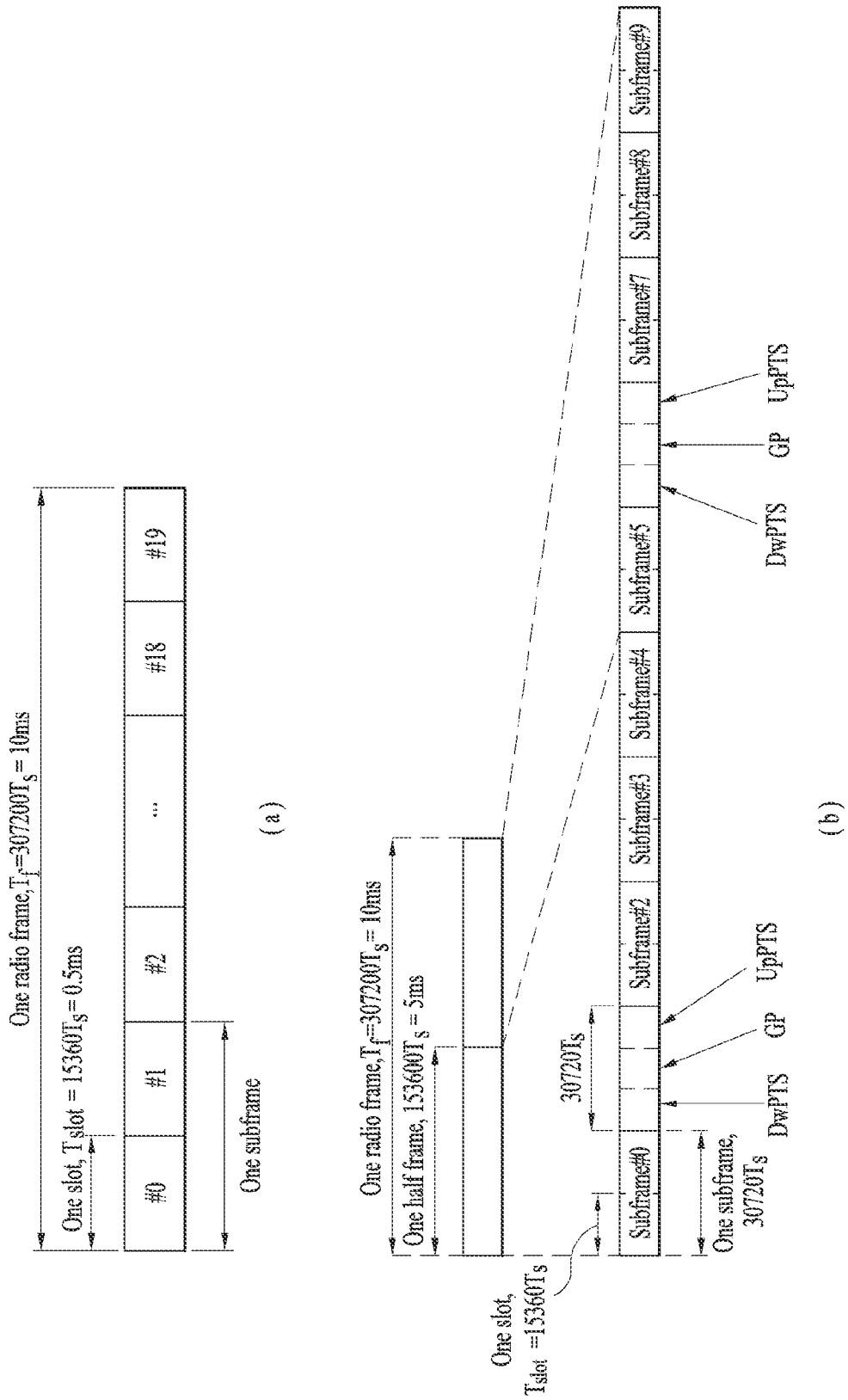
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
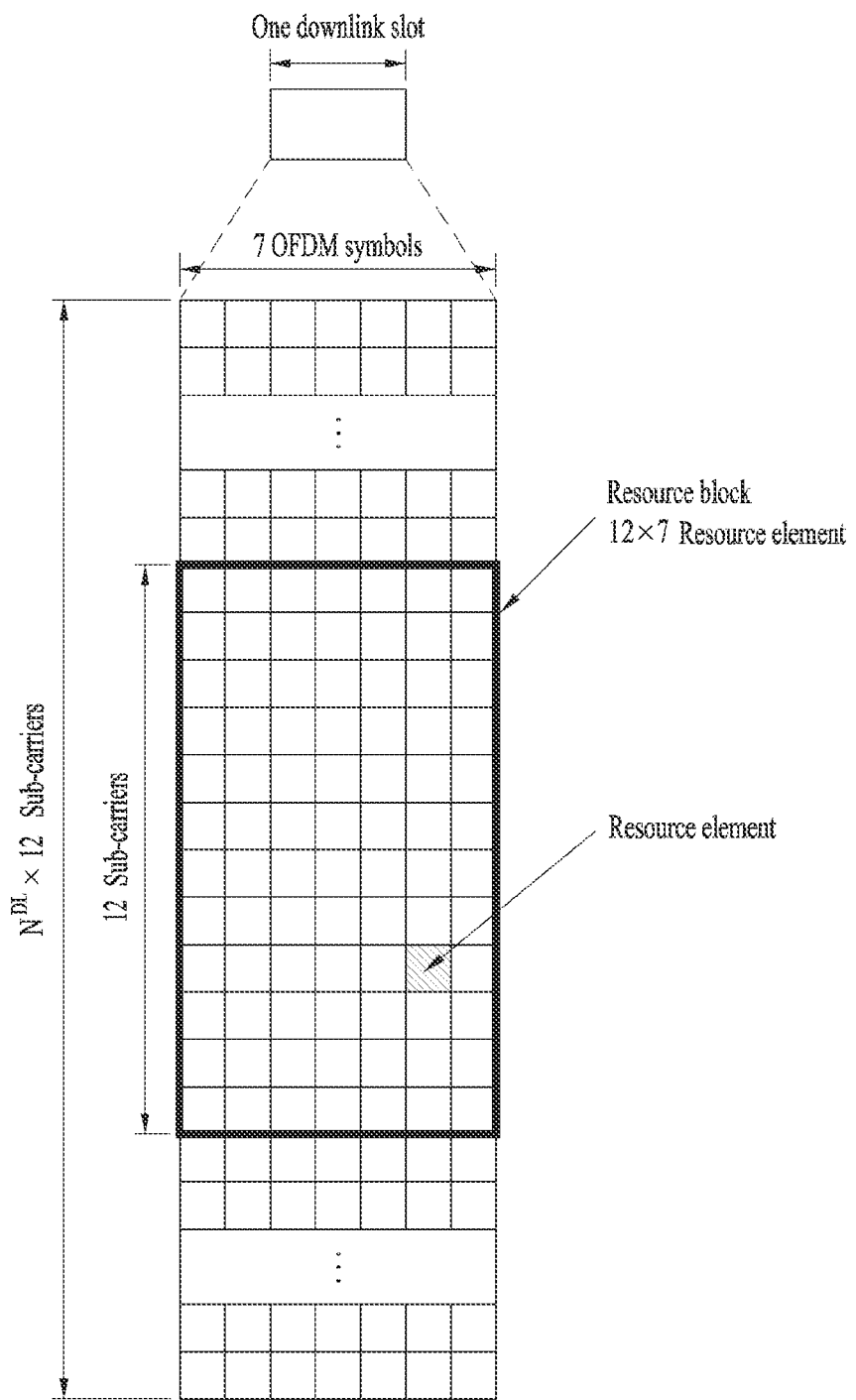
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
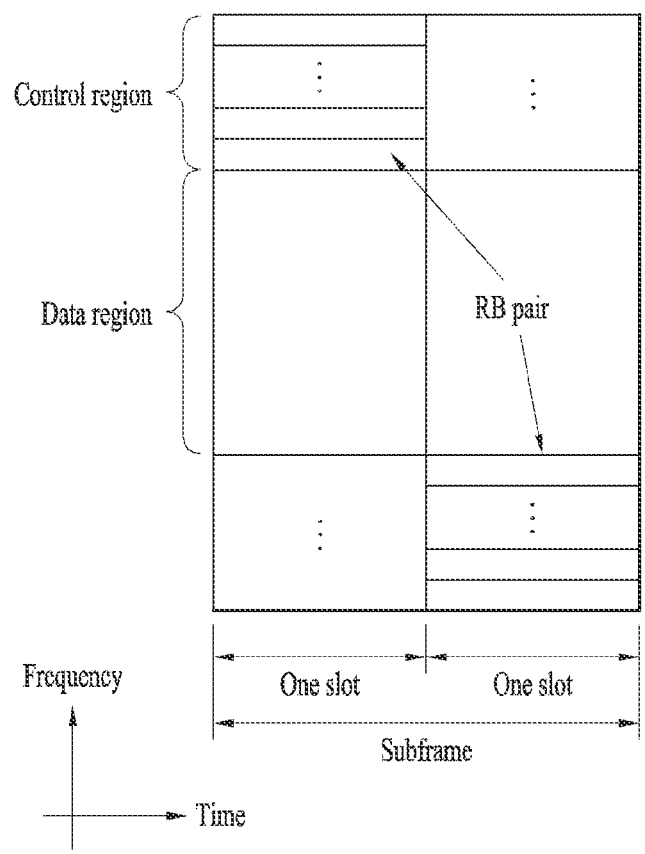
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
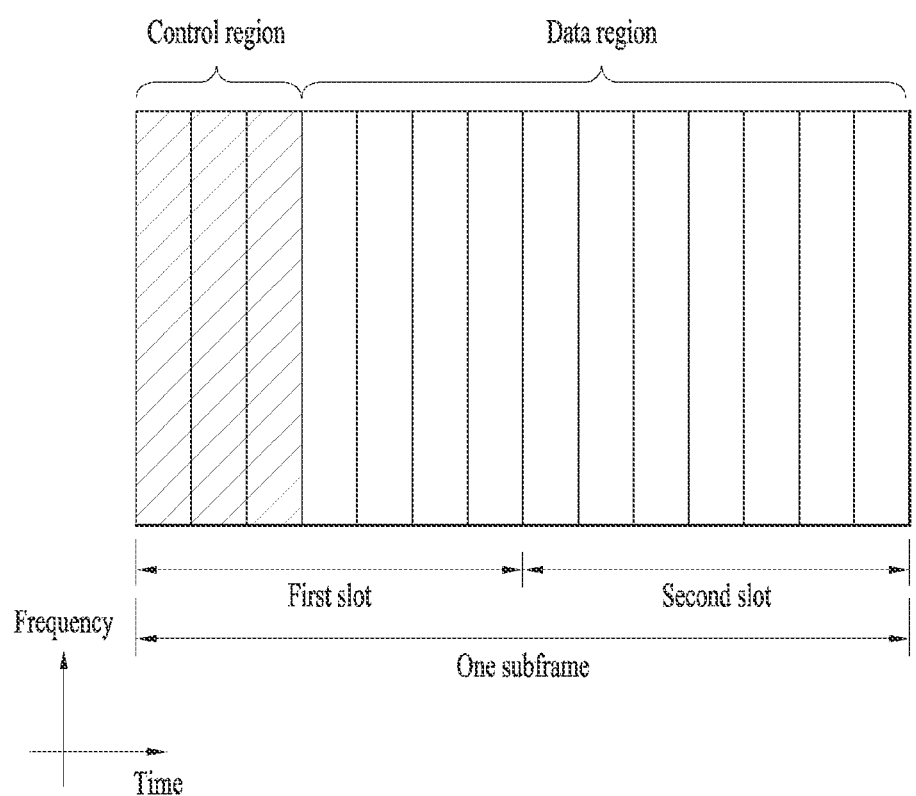
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

2. LTE-U System

2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
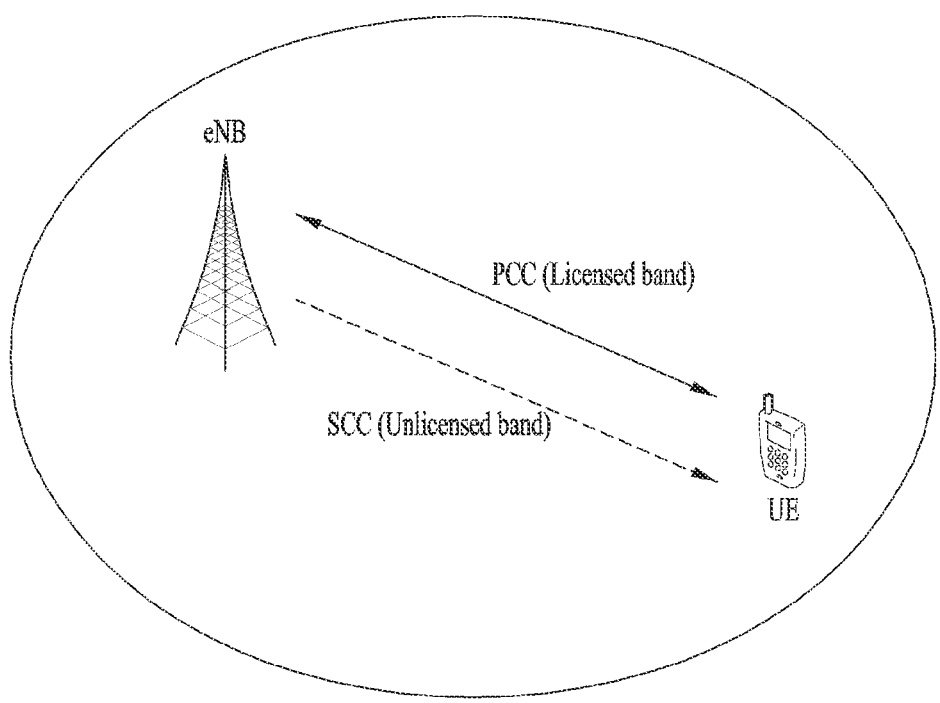
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
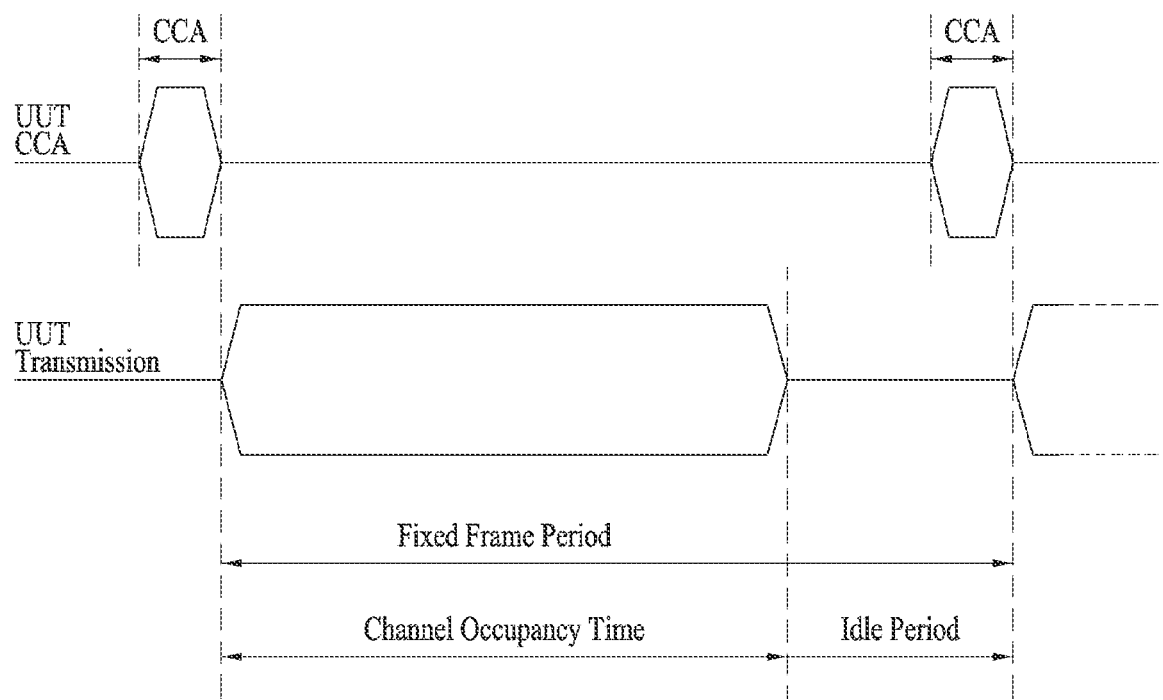
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
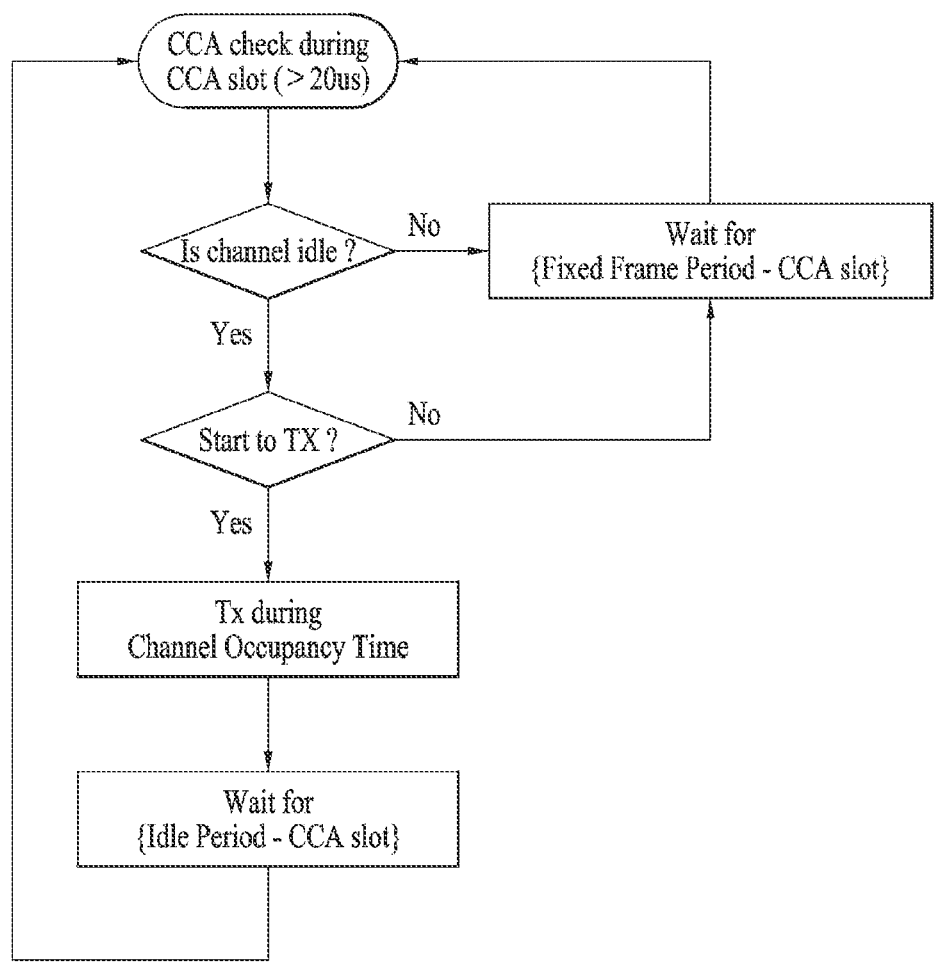
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to $(13/32)q$ ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to $(13/32)q$ ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
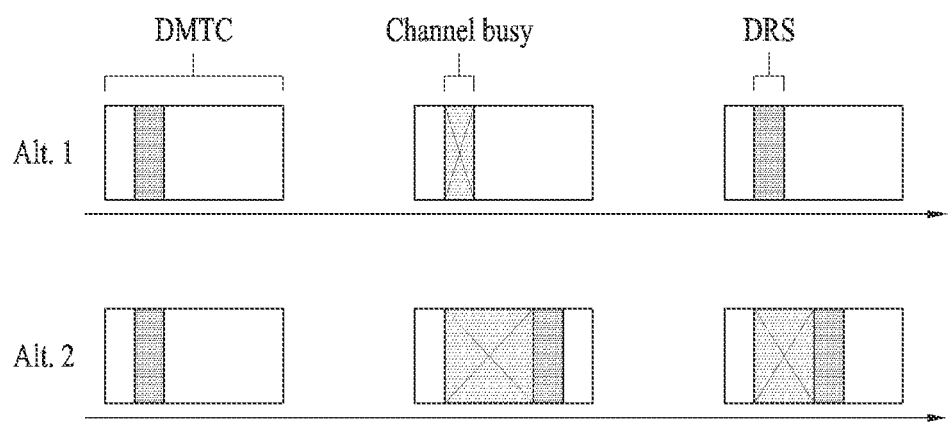
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
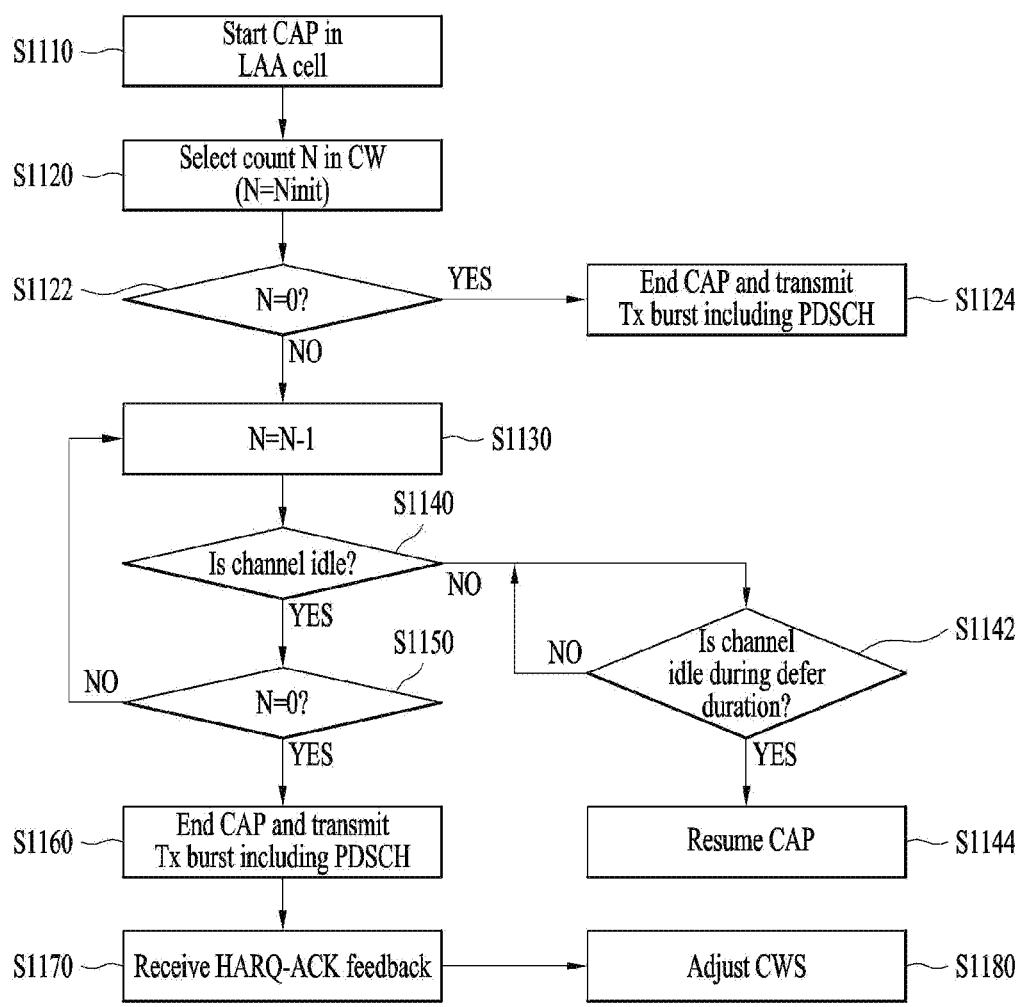
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a method of defining and configuring MCOT (maximum channel occupancy time) and a method of configuring a CWS (contention window size) in consideration of not only DL transmission but also UL transmission.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

In Release-13 LAA system, LBT parameters for DL Tx of an eNB are defined only. LBT parameters for UL Tx of a UE have not been defined yet. Hence, the present invention proposes a method of defining MCOT for performing UL Tx on an unlicensed band and a method of configuring the MCOT.

And, the present invention proposes a method of adjusting a CWS for UL Tx according to an eNB or a UE and a method of configuring a reference subframe(s) used for adjusting the CWS.

In the present invention, when a CWS is increased, it means that the CWS is increased K1 times or is increased as much as L1. When a CWS is decreased, it means that the CWS is initialized, is decreased K2 times, or is decreased as much as L2.

3.1 Definition of MCOT in LAA Uplink Proposed by the Present Invention

In Rel-13 LAA system, MCOT is defined as maximum time during which an eNB is able to perform transmission by occupying a channel after the eNB secures the channel via LBT. In this case, since Rel-13 LAA system considers DL transmission only, a scheduler is matched with a transmission entity of a signal, it was able to simply define MCOT in the aspect of the eNB. However, in case of defining MCOT for UL transmission, (since LTE system basically considers schedule-based UL transmission) it may consider UL MCOT in the aspect of an eNB corresponding to a scheduler or UL MCOT in the aspect of a UE corresponding to a transmission entity. The UL MCOT can be defined according to LBT parameters (length of defer period, CWS, MCOT, etc.) or a management entity of timing at which CCA is performed. The present invention defines the UL MCOT as follows according to each of the cases.

3.1.1 MCOT in the Aspect of UE

Basically, definition of MCOT in the aspect of a UE can be defined as maximum time during which a UE is able to perform transmission by occupying a channel after the UE secures the channel via LBT. In this case, the UE may not additionally perform a CCA operation within the MCOT. However, if MCOT longer than time permitted by a regulation (e.g., regulation of Japan) is configured, it may be able to configure the UE to additionally perform CCA during prescribed time (e.g., 34 us) after the time permitted by the regulation. Or, it may be able to configure the UE to (additionally) perform CCA during prescribed time (e.g., 34 us) according to every subframe set (e.g., 1 subframe).

3.1.1.1 First Method of Defining MCOT in the Aspect of UE

When a UE occupies a channel on an unlicensed band by performing LBT and the N number of subframes contiguous from an $n^{th}$ subframe (SF #n) at which UL transmission starts are scheduled to the UE, the UE may not additionally perform a CCA operation during the N number of contiguous subframes. In particular, the UE may consider continuously scheduled subframes (or a time period including time at which a reservation signal, which is transmitted immediately before the contiguously scheduled subframes, is transmitted) as MCOT. In other word, if discontinuous subframes are scheduled to the UE, the UE should perform LBT to transmit a subframe, which is scheduled after a specific subframe, whenever transmission of the specific subframe is completed.

For example, when a UE is scheduled to transmit UL data via an SF #n, an SF #n+2, and an SF #n+3, in order for the UE to transmit a signal in the SF #n+2 after a signal is transmitted in the SF #n, the UE should perform LBT. On the other hand, if the UE transmits a signal in the SF #2, the UE can transmit a signal until the SF #n+3 without performing additional CCA.

If a time period for which UL signals are continuously transmitted is longer than time permitted by a regulation (regulation of Japan), the UE can be configured to additionally perform CCA during prescribed time (e.g., 34 us) after the time permitted by the regulation. Or, the UE can be configured to (additionally) perform CCA during prescribed time (e.g., 34 us) according to every subframe set (e.g., 1 subframe).

The first method of defining MCOT in the aspect of the UE can be applied only when a UE does not manage LBT parameters, the timing at which CCA is performed, and the like.

3.1.1.2 Second Method of Defining MCOT in the Aspect of UE

If a UE continuously attempts to perform UL transmission during time longer than MCOT (configured via a predetermined rule, higher layer signaling, or physical layer signaling) (or if the UE is scheduled to perform UL transmission), the UE autonomously stops continuous transmission and may be able to perform LBT or CCA.

For example, when a UE is scheduled to perform UL transmission in 4 contiguous subframes including an SF #n, an SF #n+1, an SF #n+2, and an SF #n+3, if the UE starts UL transmission at the SF #n, the UE may fail to continuously perform the UL transmission after the SF #n+1 due to the MCOT restriction. In this case, after a signal is transmitted in the SF #n+1, the UE may perform LBT or CCA to transmit UL data in the SF #2. If a time period for which UL signals are continuously transmitted is longer than time permitted by a regulation (regulation of Japan), the UE can be configured to additionally perform CCA during prescribed time (e.g., 34 us) after the time permitted by the regulation. Or, the UE can be configured to (additionally) perform CCA during prescribed time (e.g., 34 us) according to every subframe set (e.g., 1 subframe).

The second method of defining MCOT in the aspect of the UE can be applied only when a UE manages LBT parameters, the timing at which CCA is performed, and the like.

The MCOT definition methods proposed by the present invention can be applied irrespective of whether a unit of scheduling performed by an eNB corresponds to a subframe or a plurality of subframes.

In this case, information on whether or not a UE is able to manage the LBT parameters or the timing at which CCA is performed can be indicated by UE capability signaling.

3.1.2 MCOT in the Aspect of eNB Scheduler

3.1.2.1 First Method of Defining MCOT in the Aspect of eNB

If MCOT is defined in the aspect of an eNB scheduler, the MCOT may act as a restriction on the number of contiguous subframes in which an eNB schedules UL data. For example, when an eNB intends to schedule an SF #n, an SF n+1, and an SF #n+2 to a specific UE, if the specific UE is not allowed to perform UL data transmission in the SF #n+2 due to the MCOT restriction, the eNB is not permitted to schedule UL transmission to the specific UE in the SF #n+2.

The MCOT definition method above can be applied irrespective of whether a unit of scheduling performed by an eNB corresponds to a subframe or a plurality of subframes. If a unit of scheduling performed by the eNB corresponds to a plurality of subframes, the maximum number of contiguous subframes capable of being scheduled by the eNB can be configured by a specific value (by MCOT value configuration). For example, if an MCOT value for performing UL data transmission is determined by 4 ms in advance, the maximum number of subframes capable of being scheduled by multi-subframe scheduling DCI (downlink control information) can be restricted to 4.

The first MCOT definition method in the aspect of the eNB can be applied only when the eNB manages LBT parameters, the timing at which CCA is performed, and the like.

3.1.2.2 Second Method of Defining MCOT in the Aspect of eNB

An eNB can be configured to inform a UE of an MCOT length or a subframe requiring CCA/LBT without a restriction on the number of contiguous subframes in which the eNB is able to schedule UL data. Specifically, the eNB can signal the UE about the MCOT length via a common PDCCH, a UE-specific PDCCH, or a PHICH. Having received the signaling, although UL data transmission longer than the MCOT length is scheduled to the UE, the UE can be configured to perform a CCA/LBT operation after UL data as much as the MCOT length is transmitted.

The second MCOT definition method in the aspect of the eNB can be applied only when the eNB manages LBT parameters, the timing at which CCA is performed, and the like.

3.2 Method of Configuring MCOT in LAA UL

Among the MCOT definition methods mentioned earlier in the paragraph 3.1, according to the first method of defining MCOT in the aspect of UE, MCOT is configured based on scheduling signaled to a UE. On the contrary, according to the second method of configuring MCOT in the aspect of UE or the method of configuring MCOT in the aspect of an eNB scheduler, a UE or an eNB configures MCOT. In the paragraph 3.2, a method of configuring MCOT configured by the UE or the eNB is explained in detail.

3.2.1 First Method of Configuring MCOT

An LBT parameter for performing LAA UL transmission may reuse an LBT parameter configured by a specific class among channel access priority classes configured for DL LBT. For example, an LAA UL LBT parameter can be configured by LBT parameters of a channel access priority class 1.

Or, it may be able to configure a different channel access priority class for a cross-carrier scheduling UE and a self-carrier scheduling UE (or a cross-carrier scheduling UE accompanied with LBT of LAA Scell for transmitting a UL grant on a licensed band). For example, since LBT is performed to transmit not only a UL grant but also UL data, an LBT parameter of a channel access priority class 2 is set to the cross-carrier scheduling UE and an LBT parameter of a channel access priority class 1 can be set to the self-carrier scheduling UE in consideration of the self-carrier scheduling UE, which is relatively difficult to occupy a channel.

3.2.2 Second Method of Configuring MCOT

It may be able to newly configure an MCOT value (or LBT parameter) for performing UL transmission. For example, the MCOT value for performing UL transmission can be always configured by 2 ms. Or, it may be able to configure a different MCOT value (or LBT parameter) for a cross-carrier scheduling UE and a self-carrier scheduling UE. Specifically, it may be able to set an MCOT value of longer (or shorter) time to a self-carrier scheduling UE (or a cross-carrier scheduling UE accompanied with LBT of LAA Scell for transmitting a UL grant on a licensed band). For example, an MCOT value of 2 ms is set to the cross-carrier scheduling UE and an MCOT value of 3 ms can be set to the self-carrier scheduling UE.

3.2.3 Third Method of Configuring MCOT

It may be able to newly define a channel access priority class for UL LBT irrespective of DL transmission transmitted on an unlicensed band and it may be able to newly define an LBT parameter according to a class.

3.2.4 Fourth Method of Configuring MCOT

An MCOT value (or LBT parameter) can be differently configured according to an UL LBT method. In this case, the UL LBT method can be mainly classified into three methods described in the following.

(1) Transmission is performed without performing LBT (2) Determine whether or not a channel is occupied during a single CCA slot only. If the channel is idle, transmission is immediately performed.

(3) Transmit UL data after category 4 (or similarly modified category)-based LBT, which performs random back-off by randomly selecting an integer from a CWS, is performed.

An MCOT value (or LBT parameter) can be differently configured depending on an LBT method selected by a UE from among the abovementioned three methods to transmit UL data. For example, as average time taken for performing LBT is longer, it may be able to configure a length of MCOT to be longer. In case of the (1), an MCOT value can be configured by 1 ms. In case of the (2), the MCOT value can be configured by 2 ms. In case of the (3), the MCOT value can be configured by 4 ms.

3.2.5 Fifth Method of Configuring MCOT

An MCOT value (or LBT parameter) can be differently configured depending on the number of UEs simultaneously scheduled in a specific subframe. As the number of contending nodes is increasing, a collision probability is increasing. Hence, as the number of simultaneously scheduled UEs is increasing, it may be able to configure a bigger CWS or shorter MCOT to be allocated.

According to the aforementioned first to fifth MCOT configuration methods, it may be able to define a different MCOT value for a cross-carrier scheduling UE and a self-carrier scheduling UE (or a cross-carrier scheduling UE accompanied with LBT of LAA Scell for transmitting a UL grant on a licensed band). For example, it may be able to set a shorter MCOT value (or a bigger CWS) to the cross-carrier scheduling UE.

Or, an MCOT value (or LBT parameter) can be differently configured depending on whether or not other RAT such as WiFi exists (e.g., by level of regulation). For example, if other RAT coexists, a shorter MCOT value can be configured compared to a case that there is no different RAT).

3.3 Relation Between MCOT in LAA DL and MCOT in UL

In LAA ACell, when an contiguous transmission unit of an eNB (or UE) is defined by a DL Tx burst (or UL Tx burst), time as much as the sum of transmission time of the DL Tx burst, transmission time of the UL Tx burst, and DL-UL switching time (or UL-DL switching time) can be regarded as MCOT defined in Rel-13 LAA system. In this case, a UE can be configured to (additionally) perform CCA during prescribed time (e.g., 34 us), which is determined according to every subframe set (e.g., 1 subframe), in the UL Tx burst as well.

Figure 12:
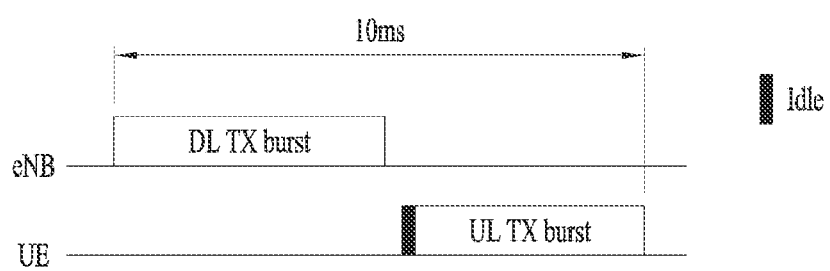
FIG. 12 is a schematic diagram illustrating MCOT, a DL Tx burst, and a UL Tx burst proposed in the present invention.

FIG. 12 is a schematic diagram illustrating MCOT, a DL Tx burst, and a UL Tx burst proposed in the present invention. FIG. 12 illustrates a case that an MCOT value corresponds to 10 ms. FIG. 12 illustrates a configuration that DL Tx burst of an eNB, DL-UL switching time, and UL Tx burst of a UE are included in a time period corresponding to the MCOT.

In general, when an eNB successfully performs category 4-based LBT and then starts DL transmission, an MCOT value is determined according to a parameter used for the eNB to perform the LBT. In this case, as shown in FIG. 12, when the MCOT value corresponds to 10 ms, the eNB may perform DL transmission during partial time only among time as much as the MCOT. In this case, when a UE performs channel sensing, the UE may determine that a channel is idle. Then, the UE may attempt to transmit UL data during the remaining MCOT.

Among the methods of defining MCOT mentioned earlier in the paragraph 3.1, similar to the second method of defining MCOT in the aspect of UE, if a UE autonomously determines MCOT, the UE receives length information on DL Tx burst and length information on DL MCOT via a common PDCCH, a UE-specific PDCCH, a PHICH, or the like and may be then able to calculate the remaining MCOT value. Or, the UE can receive the remaining MCOT value via a common PDCCH, a UE-specific PDCCH, a PHICH, or the like.

Having recognized the remaining MCOT value using the abovementioned method, the UE can transmit UL Tx burst during time within the remaining MCOT value after CCA/LBT is performed. In this case, when information on the remaining MCOT value is transmitted via a common PDCCH, a PHICH, or the like, the information can be signaled in a form described in the following.

(1) a remaining DL MCOT value including a subframe in which a common PDCCH or a PHICH is transmitted (2) a remaining DL MCOT value not including a subframe in which a common PDCCH or a PHICH is transmitted (3) indicate whether or not a subframe in which a common PDCCH or a PHICH is transmitted corresponds to DL MCOT using bit information (e.g., 1 bit)

In this case, the signaled information can further include information described in the following.

First of all, if a current subframe corresponds to DL MCOT, the signaled information can indicate an LBT type capable of performing transmission when an LBT type to be performed between an end partial subframe transmitted by a DwPTS (downlink pilot time slot) structure and a next subframe boundary is idle during fixed duration (e.g., 25 us).

And, the signaled information can indicate that it is able to transmit an SRS (sounding reference signal) or a partial PUSCH/PUCCH/PRACH between an end partial subframe transmitted by a DwPTS structure and a next subframe boundary.

(4) indicate whether or not a next subframe in which a common PDCCH or a PHICH is transmitted corresponds to DL MCOT using bit information (e.g., 1 bit)

If UL transmission such as SRS/DM-RS/PUSCH/PUCCH/PRACH is not permitted in a subframe, information on whether or not a next subframe belongs to DL MCOT is important. If the next subframe is DL MCOT and a current subframe DL MCOT, it may be able to indicate an LBT type capable of performing transmission when an LBT type to be performed between an end partial subframe transmitted by a DwPTS structure and a next subframe boundary is idle during fixed duration (e.g., 25 us).

(5) Number of subframes until an end point of MCOT including a subframe in which a common PDCCH or a PHICH is transmitted. Or, number of subframes until an end point of MCOT not including a subframe in which a common PDCCH or a PHICH is transmitted.

Figure 13:
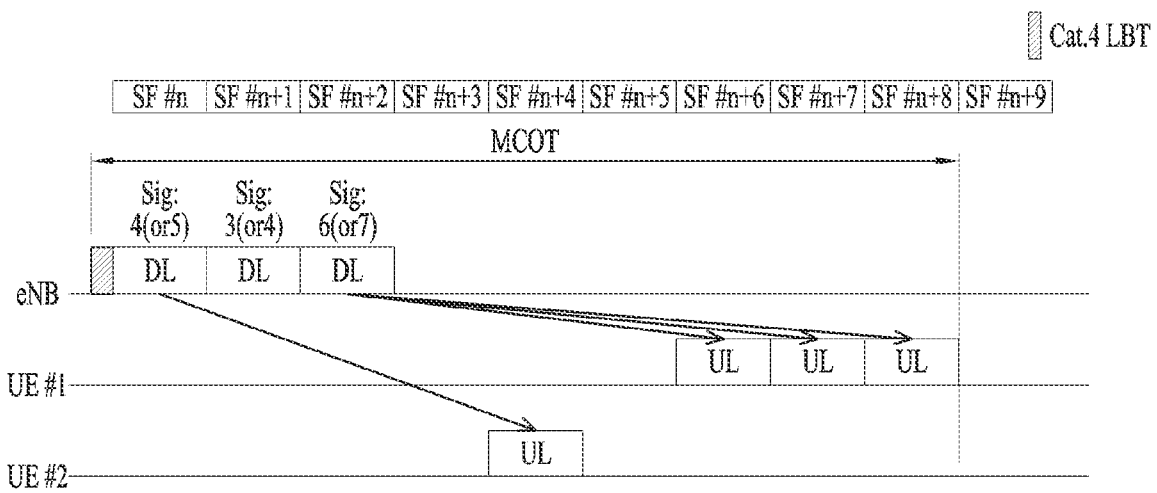
FIG. 13 is a schematic diagram illustrating operations of an eNB, a first UE, and a second UE within a MCOT period.

FIG. 13 is a schematic diagram illustrating operations of an eNB, a first UE, and a second UE within a MCOT period.

As shown in FIG. 13, an eNB performs category 4-based LBT, performs DL transmission from an SF #n, and may be able to transfer a channel to other UEs during the remaining MCOT. The eNB can UE-commonly or UE-specifically signal an end point of the MCOT via every DL subframe (or a partial DL subframe).

Having received the signaling, the UEs perform LBT to perform UL transmission until corresponding timing (end point of the MCOT). In this case, the UEs perform the LBT based on a fixed duration (e.g., 25 us) only. If a channel is determined as idle, the UEs may attempt to perform UL transmission. In this case, it may be preferable to UE-commonly transmit the signaling.

As shown in FIG. 13, the eNB can signal the UE #1 that a period ranging from SF #n to SF #4 corresponds to MCOT. In this case, the eNB can signal '4' corresponding to counting information not including the SF #n or '5' corresponding to counting information including the SF #n to the UE #1. Subsequently, the eNB can indicate a value, which is reduced as much as 1 compared to a signaling value of the SF #n, in the SF #n+1 in which additional UL scheduling does not exist. In addition, the eNB can indicate 6 (or 7) to the UE #2 in the SF #n+2 in which scheduling is performed on UL transmission during the SF #n+6 to the SF #n+8.

If the signaling is UE-commonly (e.g., via common PDCCH or PHICH) transmitted, a UE may fail to detect the signaling in a part of subframes. Yet, the UE is able to recognize MCOT end timing with reference to the most recently received signaling. For example, if the UE #1 fails to receive MCOT end timing-related signaling transmitted in the SF #n+2 and receives signaling transmitted in the SF #n+1 only, the UE #1 recognizes that the MCOT end timing corresponds to the SF #n+4 based on the received signaling. The UE #1 performs category 4-based LBT for transmitting SF #n+6 to attempt to perform UL transmission.

In addition, if the UE receives signaling indicating that a specific subframe is included in the MCOT (e.g., signaling indicating that LBT for sensing a channel is performed during a fixed duration (e.g., 25 us) only) at least one time, the UE may not expect to receive signaling indicating that a subframe appearing after the specific subframe does not belong to the MCOT.

On the contrary, in the aspect of an eNB, once the eNB signals that a specific subframe belongs to the MCOT, it may be able to configure the eNB not to signal that the subframe is excluded from the MCOT. In other word, if the eNB signals a T value at the timing of SF #n, the eNB is unable to signal a value smaller than T-k at the timing of SF #n+k.

This is because, if information on whether or not a specific subframe is included in the MCOT is changed, a UE, which has failed to receive the information, is unable to properly perform LBT. More specifically, this is because, when fixed duration CCA-based LBT is permitted only when MCOT is shared with a different node within MCOT previously obtained by an eNB (or UE), if a UE properly detects common signaling indicating that a specific subframe is included in the MCOT and fails to detect common signaling indicating that the specific subframe is not included in the MCOT, the UE performs the fixed duration CCA-based LBT in the specific subframe.

In the aforementioned signaling methods, a plurality of states can be configured in advance via higher layer signaling to reduce a signaling bit width. For example, in the method (5), a bit field of signaling is configured by a size of 2 bits and each of the states can be configured via higher layer signaling (e.g., '00' is configured by 3, '01' is configured by 6, '10' is configured by 9, and '11' is configured by 12 via higher layer signaling).

As mentioned in the foregoing description, MCOT for UL can be restricted by the number of contiguous subframes in which an eNB is able to schedule UL data. For example, as shown in FIG. 12, although an MCOT value corresponds to 10 ms, the eNB can finish DL transmission while remaining time as much as the MCOT and the UE can continuously perform UL transmission in maximum 4 subframes. In this case, the number of contiguous subframes in which the eNB is able to schedule UL data can be restricted to maximum 4 subframes.

In FIG. 12, whether a channel is idle or busy is determined during a single CCA slot between DL Tx burst and UL Tx burst. As a different example, this can also be applied to a case that a UE does not perform LBT and a case that the UE performs category 4-based LBT.

Figure 14:
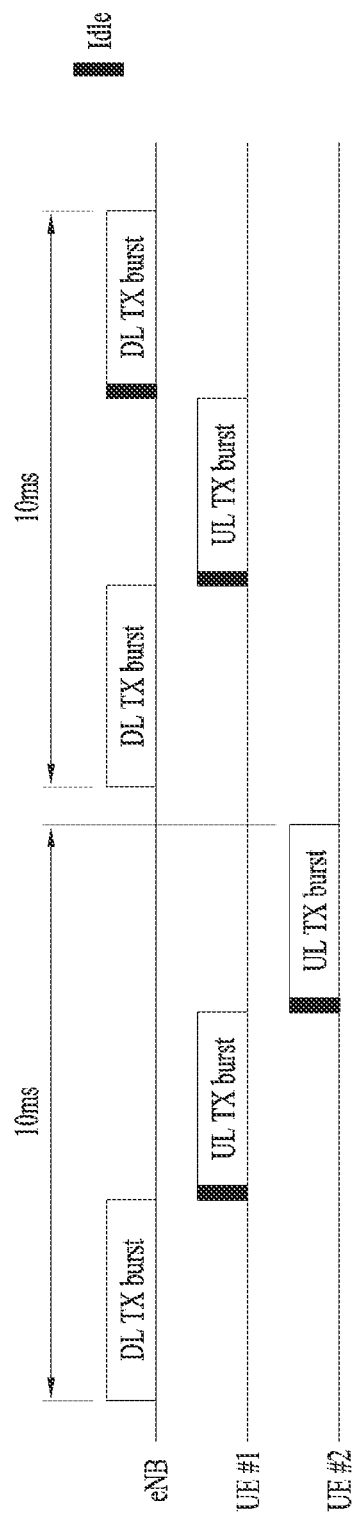
FIGS. 14 to 24 are diagrams illustrating operation examples of sharing MCOT time shared between an eNB and a UE.

FIG. 14 is a diagram illustrating an operation example of sharing MCOT time shared between an eNB and a UE.

As shown in FIG. 14, MCOT time, which is secured after LBT of an eNB is completed, can be shared by the eNB and a plurality of UEs. The MCOT time can be shared in an order of the eNB, UEs, and the eNB again. Similarly, MCOT time, which is secured after LBT of a UE is completed, can be shared by the eNB and a plurality of UEs. Or, specifically, when MCOT time is secured after a UE performs LBT, it may not be allowed to share the MCOT time with a different UE or the eNB.

When MCOT time is secured after category 4-based LBT is performed by a UE, if the MCOT time is shared with a different UE, it is necessary to consider whether or not the different UE positioned at the outside of the coverage of the UE, which has preferentially occupied a channel, is able to share the MCOT.

For example, if a cell center UE attempts to perform UL transmission using relatively small power, an energy detection threshold corresponding to the relatively small power is also relatively less sensitive. In other word, if the cell center UE occupies a channel, it is able to make sure that nodes belonging to the relatively small coverage do not transmit a signal. In particular, it is difficult to make sure whether or not nodes belonging to other coverage transmit a signal. In this situation, if MCOT secured by the cell center UE is shared with a cell edge UE, it may not be preferable when an unlicensed band operation is considered.

In order to solve the problem above, when MCOT previously secured by a specific UE is shared with a different UE, the previously secured MCOT can be shared with UEs only that attempt to perform UL transmission with power (or maximum power) less than power (or maximum power) used for the specific UE to perform UL transmission. Specifically, the MCOT can be scheduled to UEs that signal maximum power permitted on a UL grant only, Or, the MCOT can be scheduled to UEs that attempt to perform UL transmission with power less than power permitted to an eNB only.

As shown in FIG. 14, it may be able to schedule a plurality of UEs to start transmission at different timing and end transmission at different timing within DL MCOT secured by an eNB in advance. In particular, when a plurality of UEs belong to the coverage of the eNB, if a gap between transmissions of UEs is short enough, a plurality of the UEs can perform transmission at the different timing.

However, if LBT is performed before a specific UE starts to transmit a signal on an unlicensed band, in the aspect of a network, a period during which no UE transmits a signal may exist. For example, referring to FIG. 14, if a UE #1 fails to perform LBT, the UE #1 does not attempt to perform UL transmission. As a result, transmission is not attempted for considerably long time in the aspect of a network. In this case, it may not be preferable for a UE #2 to attempt to transmit a signal. This is because, if the UE #1 fails to perform LBT, it is necessary to prevent a Tx gap between the eNB and the UE #2 from being increased. Yet, it is difficult for the UE #2 to recognize or identify whether or not the UE #1 attempts to transmit a signal.

As a solution, when an eNB performs UL transmission scheduling in DL MCOT previously secured by the eNB, it may be able to configure transmission start timing of all UEs to be the same in the DL MCOT.

Figure 15:
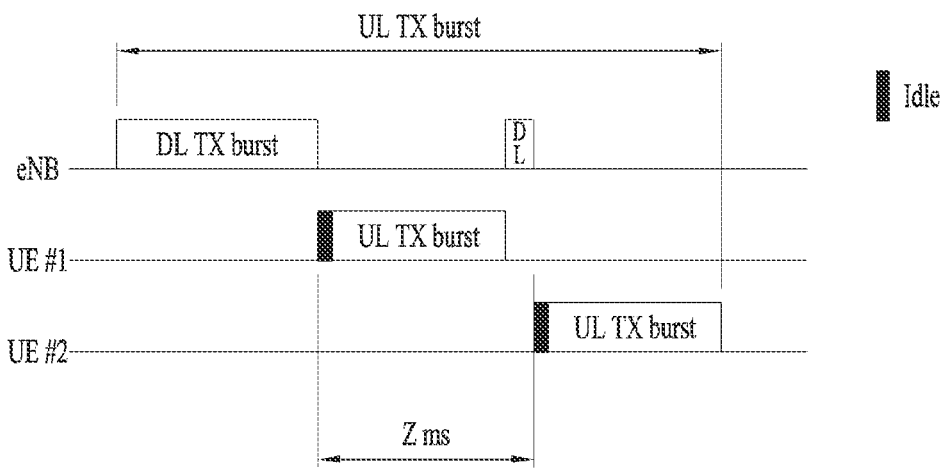

FIG. 15 is a diagram illustrating a different operation example of sharing MCOT time shared between an eNB and a UE.

For example, as shown in FIG. 15, a transmission start timing difference between UEs different from each other can be restricted to maximum Z ms (e.g., 1 ms). In particular, although a UE #1 does not attempt to perform UL transmission, a difference between last timing of transmission of the eNB and UL transmission start timing of the UE #2 can be maintained by at least Z ms. Or, it may be able to configure the UE #2 to perform LBT for performing UL transmission only when a random (or predetermined) DL signal is transmitted and received between the UE #1 and the UE #2 (and, when a difference of transmission start timing between UEs different from each other exceeds maximum Z ms).

Figure 16:
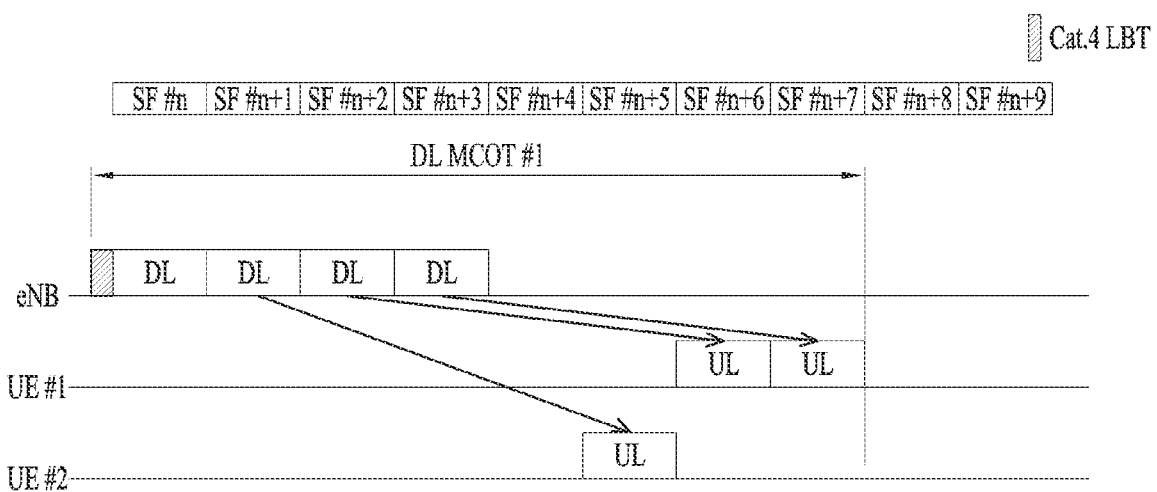

FIG. 16 is a diagram illustrating a further different operation example of sharing MCOT time shared between an eNB and a UE.

As shown in FIG. 16, when DL MCOT secured by an eNB is shared with UEs, a gap of a prescribed length may not be permitted between UL subframes within specific DL MCOT. On the contrary, a gap between an end of DL transmission and a start of the DL transmission can be permitted in consideration of UL grant to UL channel transmission latency (e.g., 4 ms). In this case, when SF #n+5 is allocated to a UE #2 and UL transmission is allocated to a UE #1 from SF #n+6, a gap (at least one symbol) for performing LBT (category 4-based LBT or LBT capable of attempting to perform transmission when a channel is idle during a fixed duration (e.g., 25 us)) can be permitted between the SF #n+5 and the SF #n+6.

Figure 17:
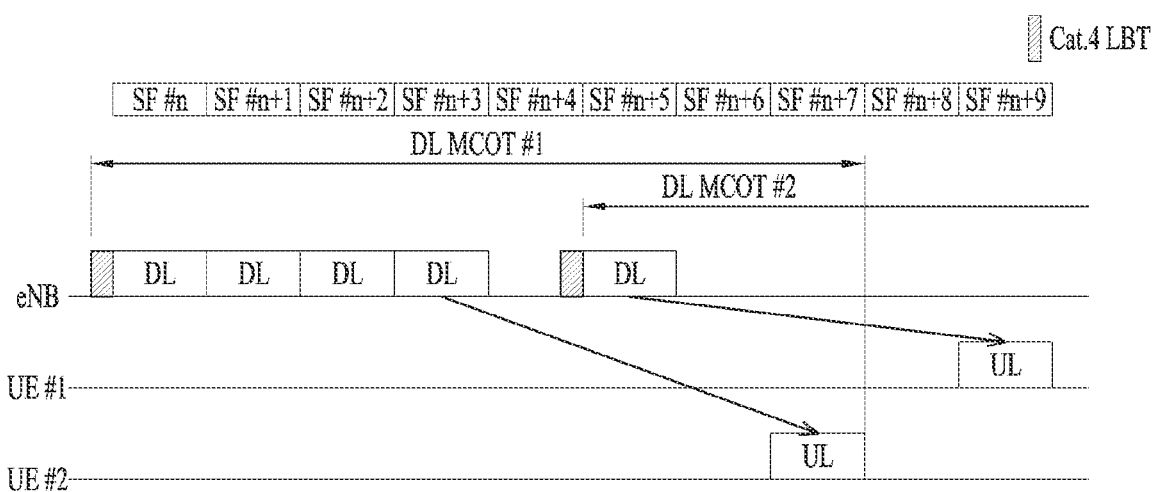

FIG. 17 is a diagram illustrating a further different operation example of sharing MCOT time shared between an eNB and a UE.

As shown in FIG. 17, an eNB schedules UL transmission in an SF #n+3, performs category 4 LBT, and may be then able to schedule UL transmission from an SF #n+5. In this case, although a previously scheduled SF #n+7 exists within DL MCOT #1, it is unable to allocate UL transmission to SF #n+8 in consideration of UL transmission scheduling latency from the SF #n+5. UL transmission can be allocated to at least SF #n+9.

In consideration of this, when MCOT is shared between an eNB and a UE within DL MCOT #2, a gap can also be permitted between UL signal transmissions. Specifically, it may not permit a separate gap between UL transmissions which are scheduled from DL subframes belonging to DL Tx burst continuous from the start of specific MCOT. In other word, it may permit a gap between UL transmissions which are scheduled from a separate DL Tx burst at which different MCOT is newly started. In this case, the gap may correspond to a gap equal to or greater than X symbols (e.g., X=2) between UL subframes. The abovementioned configuration can be applied to UL subframes in which LBT is performed (or UL subframes to which a corresponding LBT type is scheduled), In this case, the LBT may attempt to perform transmission when a channel is idle during a fixed time period (e.g., 25 us).

Figure 18:
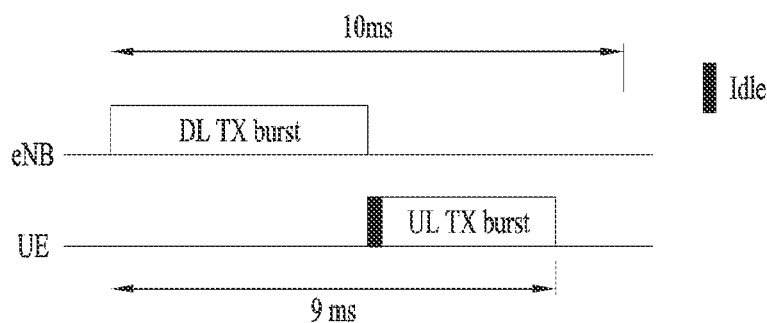

FIG. 18 is a diagram illustrating a further different operation example of sharing MCOT time shared between an eNB and a UE.

When MCOT, which is secured after LBT of an eNB is completed, is transferred to transmission time of a different transmission entity, the previously secured MCOT can be reduced or increased. As shown in FIG. 18, when a UE transmits a UL signal during the MCOT secured by the eNB, UL Tx burst transmitted by the UE can be configured to be transmitted during a period ranging from a start point of DL Tx burst to 9 ms (which is reduced as much as 1 ms from 10 ms corresponding to the MCOT value).

In this case, a time value, which is reduced (or increased) compared to a previously secured MCOT value, can be differently configured depending on a UE (e.g., cross-carrier scheduling UE or self-scheduling UE) or an LBT type performed by the UE. Or, the time value can be differently configured depending on whether or not other RAT such as Wi-Fi exists.

Figure 19:
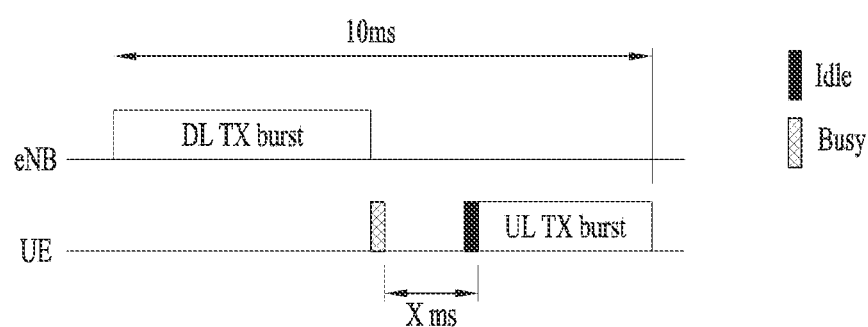

FIG. 19 is a diagram illustrating a further different operation example of sharing MCOT time shared between an eNB and a UE.

If an eNB or a UE perform channel sensing during time between DL Tx burst and UL Tx burst, the eNB or the UE may be able to determine that a channel is busy due to transmission of a different node. As shown in FIG. 19, if the UE initiates transmission of UL Tx burst according to a sensing result of a single CCA slot, although the UE fails to initiate UL data transmission during X ms, the corresponding time can be included in MCOT secured by the eNB. Or, the X ms can be excluded from the MCOT secured by the eNB. Or, when the UE performs category 4-based LBT, time for which ECCA (enhanced clear channel assessment) is performed can be included or excluded in/from the MCOT secured by the eNB.

When a different transmission entity intends to utilize the remaining MCOT of DL MCOT preoccupied by an eNB (first case), when the different transmission entity intends to utilize a time period not included in the DL MCOT, or when the different transmission entity does not intend to utilize the remaining MCOT of the DL MCOT (second case), an LBT method of a UE can be differently defined.

In this case, an LBT success rate of the first case can be configured to be higher than an LBT success rate of the second case. For example, it may be able to configure LBT to be performed in the second case while LBT is not performed in the first case. As a different example, it may be able to configure an energy detection threshold value of the first case to be greater than an energy detection threshold value of the second case. As a further different example, it may be able to configure single CCA slot LBT to be performed in the first case and it may be able to configure category 4-based LBT to be performed in the second case. More specifically, in the first case, if a channel is idle during prescribed duration (e.g., 25 us), an LBT operation attempting to transmit a UL signal can be applied. In the second case, a random backoff-based LBT operation (e.g., category 4-based LBT) attempting to transmit a UL signal by performing random back-off based on an LBT parameter corresponding to a class among 4 preconfigured classes can be applied.

Figure 20:
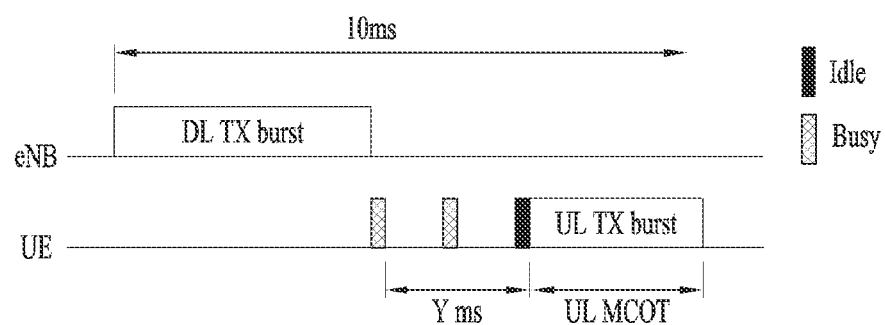

FIG. 20 is a diagram illustrating a further different operation example of sharing MCOT time shared between an eNB and a UE.

As a different example, when a UE performs channel sensing between DL Tx burst and UL Tx burst and a corresponding channel is determined as busy due to a transmission of a different node, if a specific condition is satisfied, it may be able to configure UL MCOT (e.g., MCOT configuration mentioned earlier in the paragraph 3.2) to be newly applied irrespective of a DL MCOT value. As shown in FIG. 20, when a UE initiates UL Tx burst transmission according to a sensing result of a single CCA slot, if the UE fails to initiate UL data transmission for more than X1 ms (e.g., Y>X1) or if a CCA slot is determined as busy more than N1 time, it may be able to configure UL MCOT (e.g., MCOT configuration mentioned earlier in the paragraph 3.2) to be newly applied irrespective of a DL MCOT value. And, when a UE performs category 4-based LBT, if a CWS is equal to or smaller than a specific value, if a randomly selected ECCA backoff counter value is equal to or less than a specific value, or if time during which ECCA is performed is equal to or less than a specific value, it may be able to configure DL MCOT to be valid only. Otherwise, it may be able to configure UL MCOT (e.g., MCOT configuration mentioned earlier in the paragraph 3.2) to be newly applied.

Figure 21:
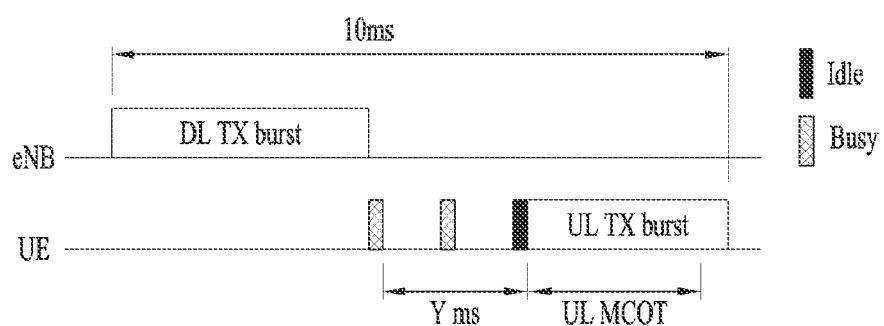

FIG. 21 is a diagram illustrating a further different operation example of sharing MCOT time shared between an eNB and a UE.

As a further different example, when a UE performs channel sensing between DL Tx burst and UL Tx burst and a corresponding channel is determined as busy due to a transmission of a different node, if the aforementioned specific condition is satisfied, it may be able to apply a UL MCOT value. However, the timing at which the UL MCOT ends can be shorter than DL MCOT previously secured by the eNB. In this case, as shown in FIG. 21, UL Tx burst transmission of the UE can be permitted until the timing at which the DL MCOT ends. In summary, when there is DL MCOT previously secured by the eNB, UL Tx burst transmission of the UE can be permitted until the later (or faster)

timing among the timing at which the DL MCOT ends and the timing at which the UL MCOT ends. On the contrary, when there is UL MCOT previously secured by the UE, UL Tx burst transmission of the UE can be permitted until the later (or faster) timing among the timing at which the UL MCOT ends and the timing at which the DL MCOT ends.

As mentioned earlier in the paragraph 3.2, it may be able to define a specific UL MCOT value for 'LBT attempting to perform transmission when a channel is determined as idle for prescribed time (e.g., 25 us) only'. In this case, a time duration as much as k ms among DL MCOT previously secured by the eNB can be utilized for UL transmission. Assume that UL MCOT configured for 'LBT attempting to perform transmission when a channel is determined as idle for prescribed time only' corresponds to N ms. In this case, the specific UL MCOT value can be configured as follows.

1) UL MCOT is configured irrespective of DL MCOT configuration. In particular, UL MCOT is always configured by N irrespective of K.

2) UL MCOT is permitted within DL MCOT. In particular, UL MCOT is always configured by K irrespective of N.

3) UL MCOT shorter than DL MCOT is permitted only under the constraint that the UL MCOT is unable to deviate from the DL MCOT. In particular, UL MCOT is configured by min (K,N).

Figure 22:
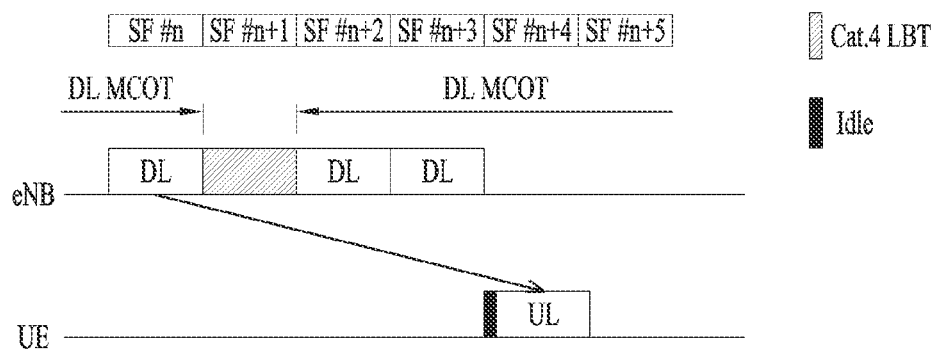

FIG. 22 is a diagram illustrating a further different operation example of sharing MCOT time shared between an eNB and a UE.

As shown in FIG. 22, assume a case that an eNB schedules UL transmission of SF #n+4 in SF #n and DL MCOT ends at the SF #n. When new DL MCOT starts from SF #n+2 after the eNB performs category 4 LBT, the present invention proposes a method of determining LBT performed by a UE for a prescheduled SF #n+4 or a method of configuring UL MCOT of corresponding UL transmission.

Proposal A>

Among UL scheduling capable of being performed in a previous DL MCOT, UL scheduling capable of belonging to a next DL MCOT may not be permitted. In this case, it may have a merit in that a UE is able to perform LBT based on a UL grant or UL LBT parameter-related signaling only irrespective of whether or not DL MCOT is included.

Proposal B>

An eNB is unable to know whether or not a UL subframe of SF #n+4 is included in DL MCOT. Hence, the eNB can signal information on LBT to be performed in a subframe not included in DL MCOT to a UE. In this case, the LBT-related information may correspond to information indicating an LBT type and the signaling can be transmitted via a UL grant or a common PDCCH, Having received the signaling, if the UE recognizes that the UL subframe to which UL transmission is scheduled is included in DL MCOT (via information such as UE-specific PDCCH, common PDCCH, PHICH, etc.), the UE can be configured to follow LBT and a UL MCOT configuration rule defined in the DL MCOT. In other word, the UE can perform LBT with an LBT type determined to be performed in MCOT rather than an LBT type indicated by the received LBT-related information. In this case, information on the DL MCOT can be transmitted via a UL grant or common PDCCH. As mentioned earlier in the paragraph 3.3, the information on the DL MCOT can indicate the number of subframes until the timing at which the DL MCOT ends.

Additionally, the abovementioned operation can be extensively applied to a case of multi-subframe scheduling as well. For example, when PUSCH of a plurality of subframes are scheduled using single DCI (e.g., UL grant) according to the multi-subframe scheduling, if one or more subframes scheduled by the single DCI are included in DL MCOT, a UE can perform LBT on the one or more subframes with an LBT type determined to be performed in MCOT rather than an LBT type indicated by the single DCI (e.g., UL grant).

Proposal C>

Unlike the proposal A, among UL scheduling capable of being performed in a previous DL MCOT, UL scheduling capable of belonging to a next DL MCOT is permitted. In this case, an eNB can be configured to signal information on LBT, which is configured to be performed at the outside of the DL MCOT, to a UE irrespective of whether or not a UL subframe is included in a new DL MCOT. In other word, as shown in FIG. 22, when the eNB schedules SF #n+4, the eNB may not allow an LBT parameter capable of being applied within the DL MCOT to be signaled to the UE. This operation can also be applied to a UE which has failed to recognize information indicating that a corresponding subframe belongs to the DL MCOT in the proposal B (via such information as UE-specific PDCCH, common PDCCH, PHICH, etc.).

As mentioned in the foregoing description, when a different transmission entity intends to utilize the remaining MCOT of DL MCOT preoccupied by an eNB (first case), when the different transmission entity intends to utilize a time period not included in the DL MCOT, or when the different transmission entity does not intend to utilize the remaining MCOT of the DL MCOT (second case), an LBT method of a UE can be differently defined. For clarity, an LBT method applicable to the first case is referred to as LBT_1 and an LBT method applicable to the second case is referred to as LBT_2.

As mentioned in the foregoing description, the LBT_1 may correspond to an LBT operation attempting to perform UL signal transmission when a channel is idle for prescribed time (e.g., 25 us) and the LBT_2 may correspond to a random backoff-based LBT operation (e.g., category 4-based LBT) attempting to perform UL signal transmission by performing random back-off based on an LBT parameter corresponding to a class among predetermined 4 classes.

In this case, operation methods of an eNB and a UE can be differently configured according to a method for the eNB to signal DL MCOT and a method for the UE to configure LBT within DL MCOT. In the following, each of options is explained in detail with reference to FIG. 23.

Figure 23:
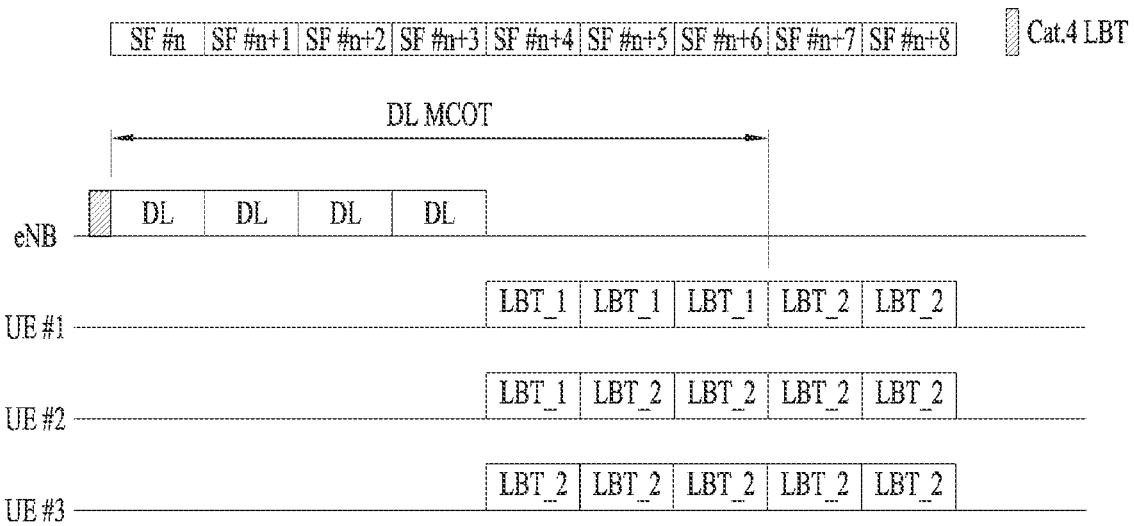

FIG. 23 is a diagram illustrating a further different operation example of sharing MCOT time shared between an eNB and a UE.

Option 1>

An eNB can signal information on whether or not UL scheduling for a specific subframe is included in DL MCOT to a UE via a combination with an LBT parameter. For example, if LBT_1 is signaled via a UL grant, the UE is able to recognize that UL scheduling corresponding to the UL grant is included in the DL MCOT. In other word, if a subframe is not included in the DL MCOT, the UE may not expect that the LBT_1 is to be signaled to the subframe.

As shown in FIG. 23, UL subframe transmission is scheduled to UE #1 to UE #3 in SFs ranging from SF #n+4 to SF #n+8. In this case, as shown in FIG. 23, LBT information can be signaled according to a subframe via each of scheduling information.

In this case, although LBT_1 for SF #n+4 is failed, the UE #1 performs the LBT_1 again in the SF #n+5 to transmit data in the SF #+5. In particular, since the eNB signals the UE #1 to perform the LBT_1 only within DL MCOT, the UE #1 can be configured to perform the LBT_1 only within the DL MCOT based on the scheduling information.

On the contrary, if the LBT_1 for SF #n+4 is failed, the UE #2 performs the LBT_2 in the SF #n+5 to transmit data in the SF #+5. In particular, although the UE #2 and the UE #3 are located within the DL MCOT in FIG. 23, the eNB can determine whether or not LBT to be performed by each of the UEs is indicated by the LBT_1 based on actual scheduling information. Having received the scheduling information, the UE can be configured to perform LBT based on signaling information only. In FIG. 23, each of the UEs can perform the LBT_2.

When contiguous UL subframes are scheduled to UEs, if the LBT_1 is signaled to a part of the UL subframes and the LBT_2 is signaled to a part of the UL subframes, the UEs stop signal transmission after the last UL subframe to which the LBT_1 is signaled, and may attempt to transmit a signal in a UL subframe again from the timing at which the LBT is completed by newly starting the LBT_2.

Option 2>

An eNB can explicitly signal information on whether or not UL scheduling for a specific subframe is included in DL MCOT to a UE via a UL grant (UE-specific PDCCH) (e.g., by adding 1-bit information) or explicitly signal the remaining MCOT via a UL grant (UE-specific PDCCH). In this case, if LBT_1 is signaled, signaling indicating that a corresponding subframe is included in the DL MCOT is accompanied. If LBT_2 is signaled, signaling indicating that a corresponding subframe is not included in the DL MCOT is accompanied. In this case, since the abovementioned case is matched with the option 1, it is difficult to have a merit of separately signaling whether or not a corresponding subframe is included in the DL MCOT.

In FIG. 23, it may be able to signal UE #1 to UE #3 that subframes corresponding to SF #n+4 to SF #n+6 are included in DL MCOT. In this case, an LBT parameter can be differently signaled according to a UE or a subframe.

In this case, although LBT_1 for SF #n+4 is failed, the UE #1 performs the LBT_1 again to transmit a signal in the SF #+5. Although LBT_1 for SF #n+5 is failed, the UE #1 can perform the LBT_1 again to transmit a signal in the SF #n+6.

On the contrary, if the LBT_1 for SF #n+4 is succeeded, the UE #2 continuously transmits a signal until the SF #n+6 and can perform the LBT_2 to transmit a signal in the SF #n+7. If the UE #2 fails to perform the LBT_1 for the SF #n+4, the UE #2 performs the LBT_1 again to attempt to transmit a signal until the SF #n+6 corresponding to the last of the DL MCOT (first method). Or, the UE #2 can configure UL MCOT (determined according to a class of the LBT_2) irrespective of the last subframe of the DL MCOT by attempting to perform the LBT_2 (second method).

Or, if the UE #2 fails to receive a UL grant for SF #n+4, misses the UL grant, or is scheduled together with the UE #3 in the SF #n+4, the UE #2 attempts to perform the LBT_1 to transmit a signal until the SF #n+6 corresponding to the last of the DL MCOT (first method). Or, the UE #2 can configure UL MCOT (determined according to a class of the LBT_2) irrespective of the last subframe of the DL MCOT by attempting to perform the LBT_2 (based on scheduling information) (second method).

In this case, information on an operation to be performed by the UE #2 among the first method and the second method can be determined in advance or can be forwarded via higher layer signaling, L1 signaling (scheduling UL grant, common PDCCH, or PHICH), or the like.

Option 3>

As mentioned in the foregoing description, an eNB can signal the remaining MCOT value to a UE via a common PDCCH, PHICH, or the like. In this case, if the UE properly receives the signaling, the UE can operate as the option 2.

Meanwhile, when the UE fails to properly receive the signaling, if the UE receives a UL grant including an LBT parameter only, an operation of the UE may become ambiguous. In this case, a necessary UE operation is proposed in the following.

For example, if a UE receives a UL grant including an LBT parameter only while failing to receive the remaining DM MCOT information, the UE can transmit a signal after the LBT_1 is performed on subframes scheduled by the LBT_1 similar to SF #n+4 to SF #n+6 of the UE #1 and SF #n+4 of the UE #2.

As a different example, the UE can abandon signal transmission without performing separate LBT on subframes scheduled by the LBT_1. In other word, the UE performs the LBT_2 on a subframe scheduled by the LBT_2 only and may be then able to attempt to transmit a signal.

As a further different example, the UE can perform LBT in a corresponding subframe by utilizing parameters related to the LBT_2 configured via higher layer signaling, a common PDCCH, or a PHICH (for subframes scheduled by the LBT_1).

Figure 24:
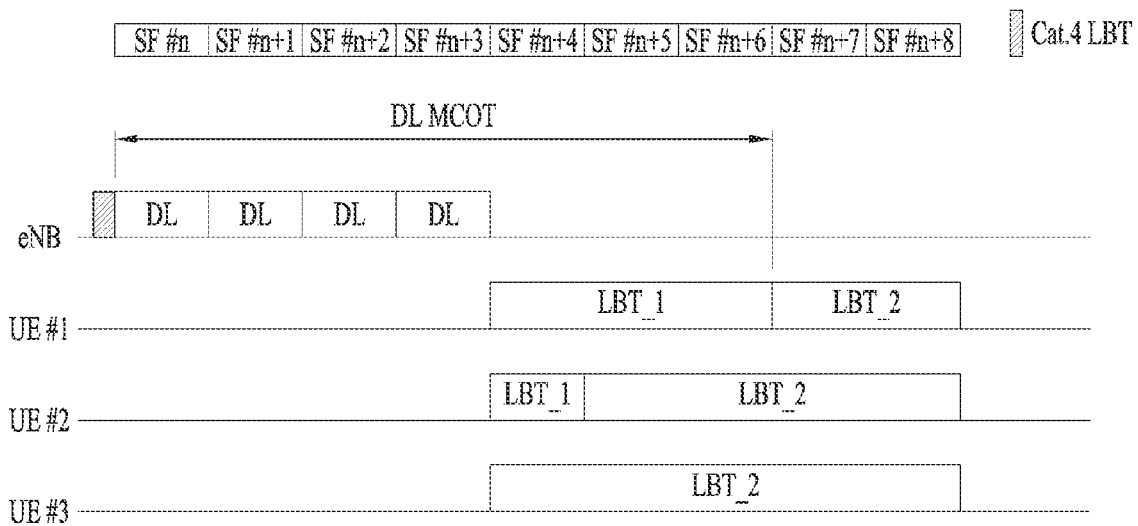

The aforementioned options 1 to 3 can also be easily and extensively applied to a case of multi-subframe scheduling. Basically, when the multi-subframe scheduling is performed, in order to schedule PUSCH of a plurality of subframes using single DCI, such information as an LBT parameter can be signaled using a representative value of the LBT parameter only to reduce DCI overhead. For example, as shown in FIG. 24, when the multi-subframe scheduling is performed, the maximum number of subframes in which an LBT parameter corresponding to the LBT_1 is signaled can be configured by subframes at which DL MCOT ends.

If information indicating a specific subframe belonging to DL MCOT is not separately signaled, a UE may attempt to perform UL transmission using an LBT method included in multi-subframe scheduling information only. For example, although LBT for transmitting a UL signal is failed in SF #n+4 (or SF #n+5), the UE #1 can perform LBT_1 during the subframe to transmit a UL signal in the SF #n+5 (or SF #n+6). And, the UE #1 can newly perform LBT_2 to perform UL transmission in SF #n+7. In this case, the UE #2 performs the LBT_1 to attempt to perform UL transmission in the SF #n+4 and performs the LBT_2 to perform UL transmission in subframes appearing after the SF #n+5.

On the contrary, if information indicating a specific subframe belonging to DL MCOT is separately signaled (via common PDCCH, PHICH, or the like), a UE can perform an LBT method not included in multi-subframe scheduling information after the information is received.

For example, when the UE #2 recognizes that SF #n+4 to SF #n+6 belong to DL MCOT, if the LBT_1 for the SF #n+4 is failed, the UE #2 performs the LBT_1 again and attempts to transmit a UL signal until the SF #n+6 corresponding to the last subframe of DL MCOT (first method). Or, the UE #2 can configure UL MCOT (determined according to a class of the LBT_2) irrespective of the last subframe of the DL MCOT by performing the LBT_2 (based on scheduled information) (second method). Or, if the UE #2 recognizes that a UL grant for SF #n+4 is not received or the UE #2 is scheduled together with the UE #3 and SF #n+4 to SF #n+6 belong to DL MCOT, the UE #2 performs the LBT_1 and attempts to transmit a signal until the SF #n+6 corresponding to the last subframe of DL MCOT (first method). Or, the UE #2 attempts to perform the LBT_2 (based on scheduling information) and configures UL MCOT (which is determined according to a class of the LBT_2) irrespective of the last subframe of the DL MCOT (second method).

In this case, information on an operation to be performed by the UE #2 among the first method and the second method can be determined in advance or can be forwarded via higher layer signaling, L1 signaling (scheduling UL grant, common PDCCH, or PHICH), or the like.

And, when information indicating a specific subframe belonging to DL MCOT is separately signaled to a UE (via common PDCCH, PHICH, or the like), if the UE fails to receive the signaling, the UE can perform a separate operation. For example, the UE can drop signal transmission without performing separate LBT on subframes scheduled by the LBT_1. In other word, the UE performs the LBT_2 on a subframe scheduled by the LBT_2 only and may b then able to attempt to transmit a signal. As a further different example, the UE can perform LBT in a corresponding subframe by utilizing parameters related to the LBT_2 configured via higher layer signaling, a common PDCCH, or a PHICH (for subframes scheduled by the LBT_1).

In case of the aforementioned options 1 to 3 and the multi-subframe scheduling, a UE can be configured to autonomously determine an LBT method to be performed on a subframe scheduled by the LBT_1 among the LBT_1 and the LBT_2.

In particular, in FIGS. 23 and 24, in order for the UE #1 (or UE #2) to transmit a UL signal in SF #n+4 to SF #n+6 (or SF #n+4), the UE #1 (or UE #2) performs the LBT_1 and/or the LBT_2 to attempt to perform UL transmission. In this case, a parameter related to the LBT_2 can be signaled via higher layer signaling, a common PDCCH, a PHICH, or the like. Although the UE #1 (or UE #2) performs the LBT_2, it may be able to configure the UE #1 (or UE #2) to perform contiguous transmission in DL MCOT. Or, as mentioned earlier in the paragraph 3.2, it may be able to configure UL MCOT irrespective of the DL MCOT.

If a specific UE fails to perform the LBT_1 at least one time within DL MCOT, the UE can be configured to perform the LBT_2 all the time. In particular, in FIGS. 23 and 24, if the UE #1 fails to perform the LBT_1 for transmitting a signal in SF #n+4, the UE #1 can be configured to perform the LBT_2 all the time to transmit a signal in SF #n+5. In this case, a parameter related to the LBT_2 can be signaled via higher layer signaling, a common PDCCH, a PHICH, or the like.

Although the UE #1 performs the LBT_2, it may be able to configure the UE #1 to perform contiguous transmission in DL MCOT. Or, as mentioned earlier in the paragraph 3.2, it may be able to configure UL MCOT irrespective of the DL MCOT.

As a different method, similar to the UE #2 shown in FIGS. 23 and 24, it may be able to configure information on the LBT_2 to be always signaled from a second subframe of the DL MCOT.

3.4 Method of Configuring Reference Subframe for CWS Adjustment

According to the aforementioned method, when a UE transmits a UL channel or a UL signal using LBT selected from among LBT_1 and LBT_2, it is difficult for an eNB to know the LBT.

For example, when an eNB indicates a UE to perform category 4-based LBT on an SF #n via a UL grant, if the SF #n is included in MCOT configured by the eNB, the eNB can indicate the UE again to perform 25 us CCA-based LBT on the SF #n via a common PDCCH (or a separate UL grant).

In this case, if the UE fails to receive the common PDCCH (or UL grant) indicating the 25 us CCA-based LBT, the UE may perform the category 4-based LBT and may be then able to transmit a UL channel or a UL signal at the timing of the SF #n. However, in the aspect of the eNB receiving the UL channel, since it is difficult for the eNB to know whether or not the UE receives the common PDCCH or the UL grant indicating the 25 us CCA-based LBT, the eNB is unable to clearly identify LBT which is performed by the UE to transmit the UL channel. As a result, when the eNB performs CWS adjustment on the category 4-based LBT, it may be difficult for the eNB to determine subframes on which the CWS adjustment is to be performed. In the present paragraph, a method of configuring a reference subframe for CWS adjustment is proposed. In this case, the reference subframe configuration method described in the present paragraph can be applied in a manner of being independent from a reference subframe configuration method to be described in the paragraph 3.6.1.

(1) When category 4-based LBT is performed, if it is UL channel transmission of a specific UE, a first subframe of UL Tx burst transmitted by the specific UE can be defined as a reference subframe. In other word, if category 4-based LBT is indicated to be performed only in subframes without indicating 25 us CCA-based LBT, the subframes may become a candidate subframe of a reference subframe.

(2) If subframes are indicated to perform category 4-based LBT at least one time, the subframes can be configured as a candidate subframe of a reference subframe. In particular, when an eNB indicates to perform category 4-based LBT on SF #n via a UL grant, if the SF #n belongs to MCOT secured by the eNB, although the eNB indicates again to perform 25 us CCA-based LBT on the SF #n via a common PDCCH or a separate UL grant, LBT for transmitting a signal in the SF #n can be performed by the category 4-based LBT depending on a situation. Hence, the SF #n can be configured as a candidate subframe of a reference subframe.

(3) If UL subframes are indicated to perform not only category 4-based LBT but also 25 us CCA-based LBT, all of the UL subframes may become a candidate subframe of a reference subframe for CWS adjustment. Since a CWS is adjusted in consideration of a collision status of a network, although a UE performs 25 us CCA-based LBT, if a collision is sensed, it is preferable to increase the CWS.

(4) If it is able to dynamically feedback information on whether or not a UE actually performs LBT, an eNB can configure a subframe in which category 4-based LBT is actually performed as a candidate subframe of a reference subframe for CWS adjustment. Specifically, dynamic feedback can be transmitted via DMRS/SRS transmission of a (predetermined) specific sequence or UCI piggyback.

The abovementioned proposal can be applied to a UL channel on which CWS adjustment is actually performed among UL channels. For example, the proposal can be applied to PUSCH transmission in which UL-SCH is included only.

The aforementioned CWS adjustment methods can be differently utilized for a case of increasing a CWS and a case of resetting a CWS. For example, in case of increasing the CWS, (2) method can be applied. In case of decreasing a CWS, it may apply the (1) method.

And, a different CWS adjustment method can be applied depending on whether a CWS value is managed by a UE or an eNB. For example, if a UE autonomously manage a CWS value, the (1) method can be applied. If a CWS value is managed by an eNB, it may apply the (3) method. In particular, when the CWS value is autonomously managed by the UE, since the UE precisely knows performed LBT, it is preferable to apply the (1) method.

As a different example, it may be able to apply a different CWS adjustment method depending on whether a UE receives a UL grant via cross-carrier scheduling or self-carrier scheduling. For example, if the UE receives the UL grant via the cross-carrier scheduling, the (1) method is applied. If the UE receives the UL grant via the self-carrier scheduling, it may apply the (2) method or the (3) method.

When MCOT preoccupied by an eNB is shared with a different UE, if a gap between a point at which DL transmission ends and a point at which UL transmission starts is equal to or less than a specific value (e.g., 16 usec), a specific UE can transmit a UL signal without separate LBT. In this case, UL signal transmission may correspond to transmission of PUCCH in which UL-SCH is included or transmission of a UL signal in which an SRS or UCI is included. And, a restriction on a maximum transmission length (e.g., 1 ms) can be applied to the UL signal.

In this case, when the UE transmits the UL signal, if the UE does not perform LBT, since LBT is performed in the eNB, it is more vulnerable to a hidden node problem. In order to mitigate the problem, the eNB can be configured to use a more conservative or sensitive energy detection (ED) threshold value to make the UE not to perform LBT when a UL signal is transmitted. In other word, when the eNB is able to explicitly signal an LBT type of UL signal transmission, in order for the eNB to perform LBT for transmitting a DL signal including the signaling, it is able to apply an ED threshold value relatively lower than that of a different DL signal transmission. For example, In equation 1, a TA value can be configured by a value greater than 10 dB (e.g., 20 dB).

(2) It may commonly apply CWS adjustment to a class having a lower (higher) priority in addition to one or more classes at which a triggering event for increasing or decreasing a CWS occurred.

(3) It commonly may apply CWS adjustment to a class including data to be transmitted (at the timing of randomly selecting a backoff counter) in addition to one or more classes at which a triggering event for increasing or decreasing a CWS occurred.

(4) It may commonly apply CWS adjustment to a class including data to be transmitted (at the timing of randomly selecting a backoff counter) only irrespective of one or more classes at which a triggering event for increasing or decreasing a CWS occurred.

3.5.1.2 Multi-Engine LBT

It may be able to configure a UE to perform LBT using two or more backoff counters on a certain component carrier (CC) (or CC group). In this case, each UE may have a different backoff counter value according to a channel access priority class. Or, each UE may have a different backoff counter value according to a type of UL data (e.g., depending on whether UL data corresponds to a scheduled PUSCH or SPS (persistent scheduling)-like contention-based PUSCH).

For example, when a backoff counter value for data corresponding to a type 1 becomes 0 and a backoff counter value for data corresponding to a type 2 becomes X (where X>0), UL data transmission of a specific UE can be initiated. In this case, if it is scheduled to transmit data of the type 2 as well in a next UL transmission after the UL data transmission is completed, a backoff counter of the type 2 can be configured to be newly selected. Or, an LBT operation can be resumed from a previous froze X value.

$$X_{Thres\_max} = \max\left\{\begin{array}{l} -72 + 10 \cdot \log10(BW \text{ MHz}/20\text{MHz}) \text{ dBm}, \\ \min\left\{\begin{array}{l} T_{max}, \\ T_{max} - T_A + (P_H + 10 \cdot \log10(BW \text{ MHz}/20 \text{ MHz}) - P_{TX}) \end{array}\right\} \end{array}\right\}$$ [Equation 1]

In the following, a method of adjusting a CWS for UL LBT according to the present invention is explained in detail.

3.5 Method of Adjusting CWS According to CWS Adjustment Entity

An entity of adjusting a CWS for UL LBT can be mainly classified into a UE and an eNB. A method of adjusting a CWS according to the present invention may vary depending on whether an entity of controlling the CWS corresponds to a UE or an eNB. In the following, the present invention proposes a method of adjusting a CWS according to a CWS adjustment entity.

3.5.1 when a UE Autonomously Adjusts a CWS 3.5.1.1 Single Engine LBT

Similar to DL LBT of Release-13 system, it may be able to configure a UE to perform LBT using a single backoff counter only on a certain component carrier (CC) (or CC group). If a triggering event for increasing or decreasing a CWS occurs, CWSs of all classes can be commonly adjusted irrespective of a class at which the triggering event occurred.

As a different method, it may be able to perform single engine LBT by applying methods described in the following to the single engine LBT.

(1) It may apply CWS adjustment to one or more classes at which a triggering event for increasing or decreasing a CWS occurred.

In this case, information on whether LBT corresponds to single engine LBT or multi-engine LBT can be UE-specifically (or UE-commonly) provided via RRC signaling (or physical layer signaling). Or, the information can be provided according to a CC via RRC signaling (or physical layer signaling). Or, information on whether it is able to perform multi-engine LBT can be indicated according to a UE via UE capability signaling.

3.5.2 when an eNB Adjusts a CWS

When an eNB adjusts a CWS, the eNB can signal an LBT parameter (e.g., CWS value, backoff counter value, length of defer period, MCOT, etc.) to a UE via a common PDCCH or PHICH. In this case, a CWS adjustment method and a signaling method may vary depending on whether the eNB UE-specifically or UE-commonly adjusts the CWS. In this case, whether the eNB UE-specifically or UE-commonly adjusts a CWS can be determined in advance, can be signaled between inter-operators, or can be signaled via X2 interface/RRC signaling/physical layer signaling.

In the following, a method for an eNB to adjust a CWS is explained in detail.

3.5.2.1 CWS Adjustment According to UE

As mentioned earlier in the paragraph 3.5.1, a method of adjusting a CWS according to a UE can be differently configured according to a single engine LBT method and a multi-engine LBT method. When a UL grant is practically transmitted, a class value to be configured according to a UE, a CWS value, a backoff counter value, and the like can be indicated via UE-specific DCI or PHICH.

As a different method, it may be able to indicate a common PDCCH via DCI scheduling UL data. Or, it may be able to indicate a UE-common class value, a CW value, a backoff counter value, and the like via PHICH.

Figure 25:
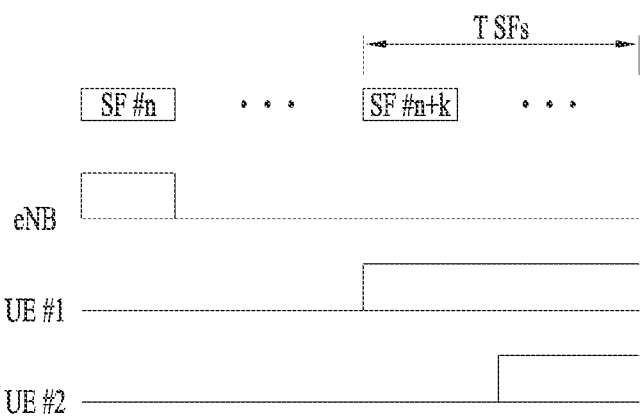
FIG. 25 is a diagram illustrating a method for an eNB to adjust CWS according to a UE to perform UL transmission.

FIG. 25 is a diagram illustrating a method for an eNB to adjust a CWS according to a UE to perform UL transmission.

As shown in FIG. 25, when an eNB indicates a class value, a CWS value, a backoff counter value, and the like via DCI scheduling UL data (or via a common PDCCH or PHICH) to an SF #n, the eNB can configure the class value, the CWS value, and the backoff counter value in consideration of UEs to be scheduled during T subframes (e.g., T=1) from the timing of SF #n+k (e.g., k=4).

For example, the eNB can indicate a maximum value (or a representative value such as a minimum value, an average value, and the like) among a CWS value and a backoff counter value of the UEs to be scheduled during the T subframes from the timing of SF #n+k. Or, the eNB can indicate a maximum value among class values. In this case, the T and the k can be configured in advance or can be configured via RRC signaling or physical layer signaling.

3.5.2.2 UE-Commonly Adjust CWS

Basically, CWS adjustment relates to success/failure of UL data transmission. A UL subframe in which UL data transmission is determined as successful or failure is defined as a 'reference subframe for CWS adjustment'. In this case, a method of defining a reference subframe for CWS adjustment shall be explained in detail in the paragraph 3.6. When UL data of a different type is transmitted according to a UE, a method of UE-commonly adjusting a CWS is proposed in the present paragraph. In this case, a type of UL data can be differently configured according to a channel access priority class. Or, the type of UL data can be differently configured according to whether the UL data corresponds to a scheduled PUSCH or an SPS contention-based PUSCH.

(1) A CWS can be adjusted according to whether data transmission is succeeded or failed in reference subframes irrespective of a type of UL data transmitted by each UE (or a type to which LBT parameter used for transmitting UL data belongs).

For example, assume that there are 3 reference subframes matched with UL data of a type 1 and data transmission in each of the 3 subframes corresponds to success/success/failure and there are 2 reference subframes matched with UL data of a type 2 and data transmission in each of the 2 subframes corresponds to success/failure. In this case, a failure ratio of a reference subframe for CWS adjustment can be calculated as (1+1)/(3+2)=40%.

(2) A CWS can be adjusted according to whether LBT is succeeded or failed in a reference subframe according to a type of UL data (or a type to which LBT parameter used for transmitting UL data belongs).

For example, assume that there are 3 reference subframes matched with UL data of a type 1 and data transmission in each of the 3 subframes corresponds to success/success/failure and there are 2 reference subframes matched with UL data of a type 2 and data transmission in each of the 2 subframes corresponds to success/failure. In this case, a failure ratio of a reference subframe for CWS adjustment can be calculated as ⅓ in case of the type 1 and 1/2 in case of the type 2, respectively. In this case, since an event triggering for increasing a CWS or an event triggering for decreasing a CW exists according to each type, it is necessary to perform CWS adjustment in consideration of the evet triggering.

(2)-1 An eNB can individually adjust a CWS according to a type. In particular, if a type triggers an event of increasing a CWS, the eNB can increase a CW of the type. If a type triggers an event of decreasing a CWS, the eNB can decrease a CW of the type.

(2)-2 If at least one type triggers an event of increasing a CWS only, the eNB can increase a CWS of all types.

(2)-3 If at least one type triggers an event of decreasing a CWS only, the eNB can decrease a CWS of all types.

(2)-4 The eNB can adjust a CWS of all types in a direction in which more events are triggered among increasing or decreasing events according to a type. For example, if a CWS increasing/increasing/decreasing event is triggered in a type 1/2/3, respectively, since the number of increasing events is bigger, the eNB can increase a CWS of all types.

(2)-5 The eNB can adjust a CWS in consideration of CWS increasing event triggering or CWS decreasing event triggering of a specific type only (e.g., lowest priority class among top priority class, lowest priority class, and actually transmitted priority class). For example, when UL data is transmitted by applying LBT parameters corresponding to types 1/2 only among types 1/2/3, if a CWS increasing event or a CWS decreasing event is triggered by the type 2 corresponding to the lowest priority, the eNB can increase or decrease a CWS of all types (or type 2).

3.5.2.3 Relation Between DL CWS Adjustment and UL CWS Adjustment

In general, since an unlicensed band operates based on random access, CWS adjustment can be applied to lower a probability of collision with a different node. When a collision occurs, an eNB considers that the collision occurs due to transmission in network coverage irrespective of whether the collision occurs due to DL transmission or UL transmission. Hence, the eNB can adjust a DL CWS and a UL CWS in a manner of associating the DL CWS with the UL CWS. For example, if an event of increasing (decreasing) the DL CWS is triggered, the eNB can increase (or decrease) not only the DL CWS but also the UL CWS. On the contrary, if an event of increasing (decreasing) the UL CWS is triggered, the eNB can increase (or decrease) not only the UL CWS but also the DL CWS.

3.6 Reference Subframe(s) for CWS Adjustment

In Release-13 LAA system, event triggering that increases or decreases a CWS value relates to ACK/NACK information of the very first subframe of DL Tx burst. More specifically, in Release-13 LAA system, if more than 80% of HARQ-ACK values of the very first subframe of recent DL TX burst correspond to NACK, a CWS is increased. Otherwise, the CWS is decreased.

In this case, if the first subframe of the DL Tx burst corresponds to an initial partial subframe, it is necessary to consider not only the first subframe but also ACK/NACK information of a full subframe appearing immediately after the first subframe. When a subframe(s) utilized for event triggering, which increases or decreases a CWS value, is defined as a reference subframe, a method of configuring a reference subframe for CWS adjustment of UL LBT and a method of adjusting a CWS using a reference subframe are described in the present paragraph.

3.6.1 Method of Configuring Reference Subframe

Figure 26:
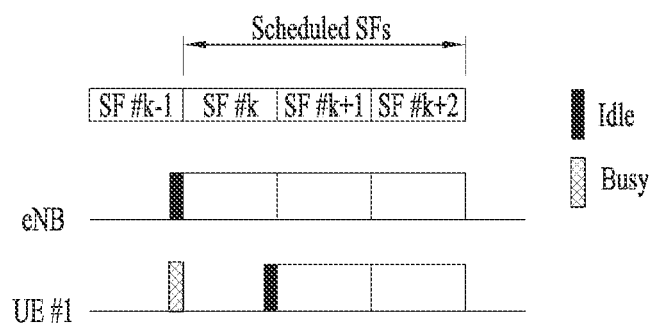
FIG. 26 is a diagram illustrating a method of configuring a reference subframe according to the present invention.

FIG. 26 is a diagram illustrating a method of configuring a reference subframe according to the present invention. A method of configuring a reference subframe is explained with reference to FIG. 26 in the following.

(1) Configure the first Y number of subframes among contiguous subframes as a reference subframe based on UL scheduling In FIG. 26, if 3 contiguous subframes starting from SF #k are scheduled to both UE #1 and UE #2 and Y is set to 1, the SF #k becomes a reference subframe for both the UE #1 and the UE #2. In this case, a value of the Y can be determined in advance or can be configured via RRC signaling or physical layer signaling.

(2) Configure the first Z number of subframes among contiguous subframes as a reference subframe based on an actually transmitted subframe In FIG. 26, if a UE #1 transmits a signal in 3 contiguous subframes starting from SF #k, a UE #2 transmits a signal in 2 contiguous subframes starting from SF #k+1, and Z is set to 1, the SF #k becomes a reference subframe for the UE #1 and the SF #k+1 becomes a reference subframe for the UE #2.

(3) When a plurality of UEs are scheduled to start at the same time, a reference subframe can be configured on the basis of a UE having a latest first transmission among a plurality of the UEs.

As shown in FIG. 26, it may be able to schedule both a UE #1 and a UE #2 to start to transmit UL data from SF #k at the same time. However, since a channel state of the UE #1 is different from a channel state of the UE #2, the UE #2 can start actual transmission from SF #k+1. In this case, a reference subframe for both the UE #1 and the UE #2 may correspond to SF #k+1 in consideration of the transmission of the UE #2 started from the SF #k+1. Or, a reference subframe for the UE #1 corresponds to SF #k and SF #k+1 and a reference subframe for the UE #2 can be configured by SF #k+1. Or, a reference subframe for both the UE #1 and the UE #2 can be configured by SF #k and SF #k+1.

(4) When an eNB transmits a UL grant to a specific UE at the timing of SF #n, if ACK is detected from UL Tx burst, which is received from the UE, in a first subframe and the first subframe corresponds to the latest subframe among subframes appearing prior to SF #n-k (e.g., k=4), the first subframe can be configured as a reference subframe of the UE.

In the abovementioned method of configuring a reference subframe, in the aspect of a certain UE, a reference subframe may correspond to a partial subframe in which a partial SC-FDM symbol is transmitted only. In this case, a reference subframe for the UE can be configured by all subframes until a subframe appearing after the partial subframe.

3.6.2 Method of Adjusting CWS Using Reference Subframe

Similar to Release-13 LAA system, if a transmission failure ratio of UL data, which is transmitted in a reference subframe, is equal to or greater than W %, it may increase a CWS. Otherwise, it may decrease a CWS. However, since a method of calculating a success/failure ratio varies depending on whether or not a reference subframe corresponds to a subframe in which a signal is actually transmitted, whether or not a UL grant is transmitted by self-carrier scheduling, a case of transmitting a plurality of codewords in a subframe, a case that a reference subframe includes a plurality of subframes, and the like, a calculation method is explained in detail in the following.

(1) Determine success/failure according to whether or not a reference subframe corresponds to a subframe in which a signal is actually transmitted As mentioned earlier in the method 1 of the paragraph 3.6.1, a subframe in which a signal is not actually transmitted can also be regarded as a reference subframe. Whether or not a signal is actually transmitted in a subframe can be determined by an eNB based on whether or not a DMRS is detected. If it is determined that a signal is not actually transmitted in a subframe, it can be unconditionally regarded as a failure. Or, the subframe may not be used for adjusting a CWS.

(2) Determine success/failure according to whether or not a UL grant is transmitted by self-carrier scheduling or cross-carrier scheduling Although it is determined as a signal is not actually transmitted in a subframe, if UL data is not transmitted in the subframe due to the failure of receiving a UL grant in the subframe (rather than incompletion of LBT), it can be unconditionally regarded as a failure. Or, the subframe may not be used for adjusting a CWS.

Or, if UL data is not transmitted in a subframe due to the failure in receiving a UL grant transmitted by cross-carrier scheduling in the subframe, the subframe may not be used for adjusting a CWS. In this case, it is necessary for an eNB to determine a reason of failure in transmitting the UL data among the incompletion of LBT and the failure in receiving the UL grant. To this end, signaling for indicating the information can be configured on a licensed band or LAA Scell.

(3) When a plurality of codewords are transmitted in a subframe

It is able to determine (transmission) success/failure according to a codeword for a single UE. Although a plurality of codewords are transmitted in a subframe, it may operate as if a single codeword was transmitted in the subframe. In this case, if any one of a plurality of the codewords fails (or succeeds), the subframe can be regarded as a failure (or success).

(4) When a reference subframe includes a plurality of subframes

It is able to determine success/failure according to a subframe for a single UE. Or, although a signal is transmitted in a plurality of subframes for a single UE, it may operate as if a signal was transmitted in a single subframe only.

In this case, if any one of a plurality of the subframes fails (or succeeds), the subframe can be regarded as a failure (or success).

3.6.3 CWS Update in the Aspect of UE

According to the present invention, as shown in Table 3 in the following, and eNB informs a UE of whether or not decoding is succeeded according to UL Tx burst and the UE can update a CWS based on the information.

TABLE 3

For category 4 LBT for PUSCH transmission on LAA SCell
The reference scheduled burst is the most recent set of contiguous (i.e. without any gap in between) scheduled UL subframe(s) for the UE that is expected to start after a category 4 LBT and is expected to end at least 4 subframes earlier than the subframe in which the following contention window size adjustment is transmitted.
The reference subframe is the first subframe in the reference scheduled burst where the eNB successfully decodes at least one transport block from the UE.

TABLE 3-continued

The position of the reference subframe within the reference scheduled burst is signaled to the UE in the UL grant in which Cat. 4 LBT is signaled as the LBT type to the UE. The eNB can also signal that no reference subframe was detected.
If the UE first transmitted in the reference scheduled burst earlier than the signaled reference subframe, the CWSs for all the priority classes are increased.
If the UE first transmitted in the reference scheduled burst later than the signaled reference subframe, the CWSs for all the priority classes are left unchanged.
If the UE first transmitted in the reference scheduled burst in the signaled reference subframe, the CWSs for all the priority classes are reset.
The CWS is reset to the minimum value if the maximum CWS is used for K consecutive LBT attempts only for the priority class for which maximum CWS is used for K consecutive LBT attempts.
K is selected by eNB and RRC configured to the UE from the set of values from (1, . . . , 8).

In this case, a method of updating a CWS in the aspect of a UE according to the present invention is described in the following.

Figure 27:
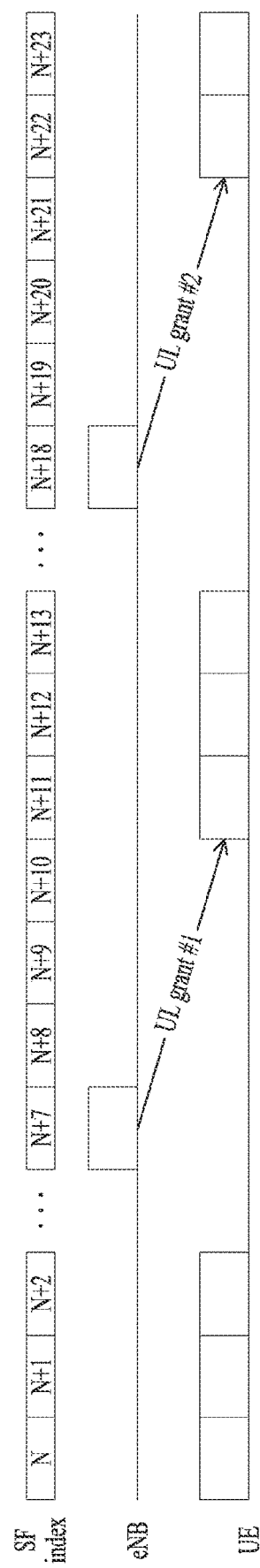
FIG. 27 is a schematic diagram illustrating a method of updating CWS according to the present invention.

FIG. 27 is a schematic diagram illustrating a method of updating CWS according to the present invention.

As shown in FIG. 27, a UE can start transmission from SF #N after the UE successfully performs LBT on UL Tx burst which is scheduled by SFs ranging from SF #N to SF #N+2.

In this case, an eNB regards the UL Tx burst, which is completed at SF #N+2, as a reference scheduled burst at the timing of SF #N+7. If PUSCH decoding is succeeded at SF #N, the SF #N can be regarded as a reference subframe. It may be able to transmit signaling indicating that the SF #N corresponds to the reference subframe to a UE via a first UL grant (UL grant #1) at the timing of SF #N+7. Having received the first UL grant, the UE can reset a CWS. On the contrary, it may be able to transmit signaling indicating that SF #N+1 corresponds to a reference subframe to the UE via a first UL grant at the timing of SF #N+7. Having received the first UL grant, the UE can increase a CWS. In this case, the UL grant can be transmitted on LAA Scell or a licensed band.

When the eNB schedules UL Tx burst scheduled by SFs ranging from SF #N+11 to SF #N+13, the eNB may be able to transmit signaling to the UE to indicate that it fails to successfully receive PUSCH in any subframe among the SF #N+11 to SF #N+13 and a reference subframe does not exist in a reference scheduled burst in transmitting a second UL grant (UL grant #2) in SF #N+8. The situation above may occur in the following cases.

(1) Although the UE successfully receives the UL grant #1, since the UE fails to perform UL LBT on SF #N+11 to SF #N+13, the UE does not attempt to perform transmission In this case, the present invention proposes a method of maintaining a CWS value (for priority classes of all LBT) as it is. In other word, if the UE receives signaling indicating that there is no reference subframe in reference scheduled burst and there is no subframe in which transmission is recently attempted on the reference scheduled burst, a CWS value (for priority classes of all LBT) can be maintained as it is.

(2) Although the UE successfully receives the UL grant #1 and attempts to perform transmission by successfully performing UL LBT on at least one subframe among SF #N+11 to SF #N+13, the eNB fails to decode PUSCH in all subframes.

In this case, the present invention proposes a method of increasing a CWS value (for all priority classes). In other word, if the UE receives signaling indicating that there is no reference subframe in reference scheduled burst and there is at least one subframe in which transmission is recently attempted on the reference scheduled burst, it may be able to increase a CWS value (for all priority classes).

(3) When the UE fails to successfully receive the UL grant #1

In this case, the UE considers that information on a position of a reference subframe signaled by UL grant #2 corresponds to information on transmission of SF #N to SF #N+2. The UE can update a CWS according to a relation between the transmission of SF #N to SF #N+2 and the position of the reference subframe.

In particular, if a reference scheduled burst is not aligned between an eNB and a UE due to the missing of the UL grant, and the like, the eNB or the UE may fail to properly perform CWS update. As a solution, the present invention proposes a method of additionally including sequence information on a UL Tx burst in the UL grant.

A UL grant can signal a sequence index of UL Tx burst scheduled by the UL grant by X bit (e.g., X=2) and signal a sequence number of a reference scheduled burst of the UL grant by Y bit (e.g., Y=2). For example, an eNB can designate such a Tx burst sequence as '00' for a UL Tx burst of SF #N+11 to SF #N+13 scheduled by a UL grant #1. And, the eNB designates such a Tx burst sequence as '01' for a UL Tx burst of SF #N+22 to SF #N+23 scheduled by a UL grant #2 and can signal that a reference scheduled burst of the UL grant corresponds to a UL Tx burst designated by a sequence number '00'. In this case, if a UE fails to receive the UL grant #1 that schedules the sequence number '00', the UE can hold a CWS value (for all priority classes) irrespective of signaling indicating a position of a reference subframe.

If sequence information on a UL Tx burst is additionally included in a UL grant, it is not necessary to have a restriction between the timing at which the UL Tx burst ends and the timing at which the position of the reference subframe is signaled when a reference scheduled burst is defined.

3.6.3.1 Method of Updating CWS when Multi-Subframe Scheduling is Performed

Figure 28:
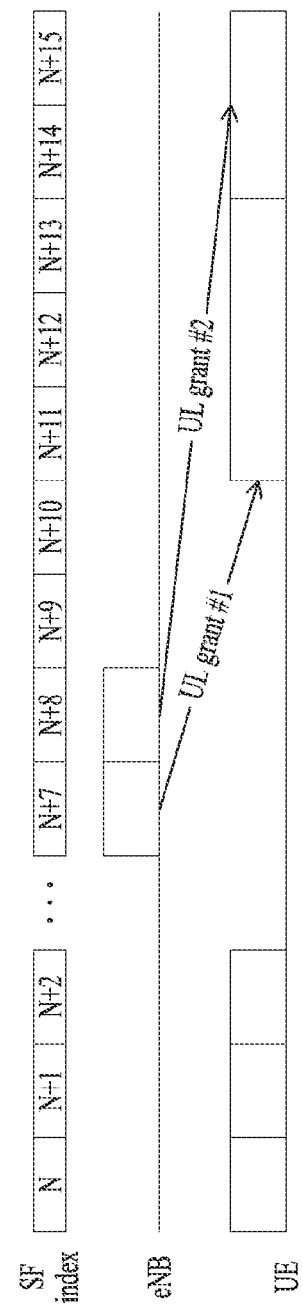
FIG. 28 is a schematic diagram illustrating a method of updating CWS when multi-subframe scheduling is performed.

FIG. 28 is a schematic diagram illustrating a method of updating a CWS when multi-subframe scheduling is performed.

If multi-subframe scheduling is introduced, as shown in FIG. 28, an eNB can schedule a plurality of UL subframes at the same time via single DCI in a single subframe. In particular, the eNB can schedule a plurality of UL subframes (maximum 4 UL subframes) via a plurality of multi-subframe DCI in a single subframe.

Referring to FIG. 28, although a UL grant #1 and a UL grant #2 are transmitted in a different subframe, the two UL grants can be transmitted to a single UE in the same subframe. In this case, since a reference scheduled burst for the UL grant #1 is identical to a reference scheduled burst for the UL grant #2, if a specific UE receives the two UL grants, the specific UE can helpfully utilize reference subframe position information of the UL grant #1 among the two UL grants. In this case, the present invention proposes a method of not utilizing information (e.g., UL grant), which is duplicately received by a UE, for updating a CWS.

(1) An eNB can perform explicit signaling via a UL grant #2 to hold a CWS. For example, when a field indicating a position of a reference subframe is configured by Z bits (e.g., Z=4), a specific state (e.g., 1111) of the field may correspond to an indication indicating to hold a CWS. Or, if a state of indicating a position of a reference subframe by '−1' is added to the signaling, it may be able to configure a CWS to be held under a condition that 'If the UE first transmitted in the reference scheduled burst later than the signaled reference subframe, the CWSs for all the priority classes are left unchanged'. In particular, although a UL grant #1 and a UL grant #2 schedule discontinuous UL TX bursts, the CWS holding signaling can be usefully used for a case that a new reference scheduled burst does not exist between the timing at which the UL grant #1 is transmitted and the timing at which the UL grant #2 is transmitted.

(2) When a UE receives a plurality of DCI corresponding to a UL TX burst, the UE can utilizes only reference subframe position information of DCI that schedules a plurality of subframes including a first subframe of the UL Tx burst.

For example, in FIG. 28, category 4 LBT is indicated via a UL grant #2 and a relevant parameter can be signaled in consideration of a case that a UE does not receive a UL grant #1. However, the UE can obtain information indicating that there is no gap between SF #N+13 and SF #N+14 via scheduling information on the UL grant #1 and the UL grant #2. In particular, the UE can recognize that the UL grant #1 and the UL grant #2 schedule contiguous UL TX bursts. Hence, the UE can consider that reference subframe position information on the UL grant #1, which schedules a preceding UL subframe, is valid only.

If the UL grant #1 and the UL grant #2 schedule discontinuous UL Tx bursts, although there is no new reference scheduled burst between the timing at which the UL grant #1 is transmitted and the timing at which the UL grant #2 is transmitted, the UE may consider that reference subframe position information of the UL grant #2 is not valid.

(3) If a UL grant includes sequence number information on a UL TX burst and reference subframe position information corresponding to the same sequence number is received from a plurality of DCI, a UE can be configured to perform CWS update on the reference subframe position information one time only.

Meanwhile, when validity of a reference scheduled burst is determined, a UE may consider that reference subframe position information on a specific UL Tx burst is not valid if T ms is elapsed from the last scheduled subframe of the specific UL TX burst. In this case, a CWS is reset or can be held (irrespective of the reference subframe position information). This is because, if sufficient time as much as T ms (e.g., T=40) is elapsed, a channel state changes.

Or, if an eNB attempts to schedule other UEs between the timing (T1) at which a UE #0 is scheduled and the timing (T2) at which the UE #0 is scheduled again, the eNB can transmit signaling to the UE #0 to make the UE #0 reset or hold a CWS value irrespective of reference subframe position information on the UE #0, which is included in a UL grant of the T2 timing.

3.6.3.2 Method of Adjusting CWS Via HARQ Process Index Indication

When an eNB transmits a UL grant to a specific UE at the timing of SF #n, the eNB signals a HARQ process index of a reference subframe to the UE via the UL grant. Having received the signaling, the UE can perform CWS adjustment based on the received HARD process index. In this case, definition of the reference subframe may follow the method 4 mentioned earlier in the paragraph 3.6.1.

Figure 29:
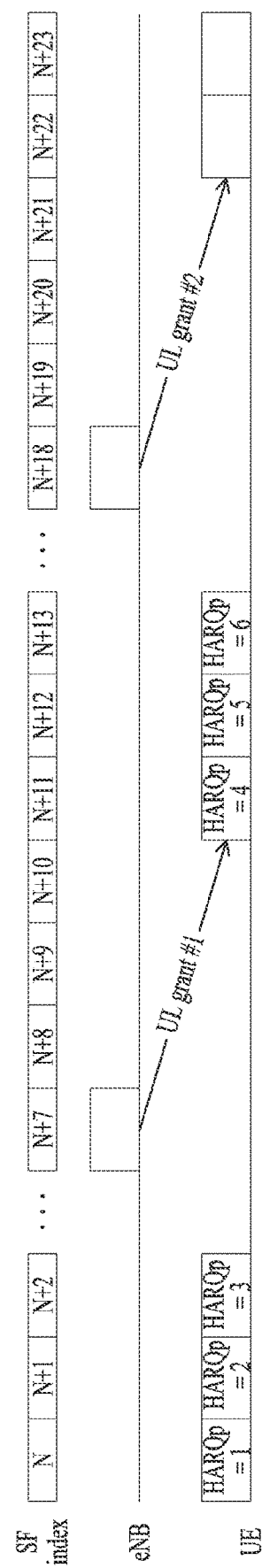
FIG. 29 is a schematic diagram illustrating a method of adjusting CWS via a HARQ process index indication according to the present invention.

FIG. 29 is a schematic diagram illustrating a method of adjusting CWS via a HARQ process index indication according to the present invention. A method of adjusting a CWS according to the present invention is explained in the following with reference to FIG. 29.

(1) Among subframes appearing prior to SF #n-k (e.g., K=4), if a HARQ process index of a first subframe of a UL TX burst transmitted by a UE is matched with a HARQ process index which is signaled by a received UL grant, the UE can reset CWS values corresponding to all priority classes.

For example, in FIG. 29, if a HARQ process index of a UL grant #2, which is transmitted at the timing of SF #N+18, is indicated by 4, it means that an eNB has successfully received a first subframe included in a previous UL Tx burst. Hence, a UE can reset CWS values corresponding to all priority classes.

(2) If a UE never attempts to transmit a UL signal prior to SF #n-k (e.g., k=4) on a specific carrier or does not receive scheduling of PUSCH corresponding to a HARQ process index signaled during T time (e.g., 1 second) prior to the SF #n-k (e.g., k=4), the UE can hold (or reset) CWS values corresponding to all priority classes.

For example, in FIG. 29, if a HARQ process index of a UL grant #2, which is transmitted at the timing of SF #N+18, is indicated by 10 and transmission is never attempted on a corresponding carrier with the HARQ process index, a UE can hold a CWS value corresponding to all priority classes while signaling related to the HARQ process index is ignored.

(3) Except the aforementioned (1) or (2) case, or among subframes appearing prior to SF #n-k (e.g., K=4), if a HARQ process index of a first subframe of a UL TX burst transmitted by a UE is not matched with a HARQ process index which is signaled by a received UL grant, the UE may increase a CWS value corresponding to all priority classes. For example, in FIG. 29, if a HARQ process index of a UL grant #2, which is transmitted at the timing of SF #N+18, is indicated by 5, it means that an eNB has failed to successfully receive a first subframe included in a previous UL Tx burst. Hence, the UE can increase CWS values corresponding to all priority classes.

3.6.4 CWS Update Signaling Method

In the proposed method mentioned earlier in the paragraph 3.6.3, when reference subframe position information on a UL Tx burst is signaled, K-bit information can be included in a UL grant. Since a length of the UL Tx burst is equal to or greater than maximum 8 ms, it may be preferable to configure the K by 4. 16 states of a field of 4-bit size can further include one of information described in the following as well as 8 (or 10) states indicating reference subframe position information (an offset value of a reference subframe from the start point of a reference scheduled burst).

information indicating that a reference subframe is not discovered information indicating that a CWS value is to be held information indicating 25 us LBT (e.g., if idle is maintained during 25 us only without random backoff, transmission is permitted)

In particular, since a position of a reference subframe is signaled to a UE which is expected to perform category 4 LBT only, the position of the reference subframe may not be signaled to a UE which is expected to perform 25 us LBT.

For example, the 16 states of the aforementioned field are illustrated in Table 4. Yet, Table 4 is just an example only. A mapping relation according to each state can be changed according to an implementation example or an implementation method.

TABLE 4

| State | Message |
|---|---|
| 0000 | Cat 4 LBT, Reference subframe position: 1st |
| 0001 | Cat 4 LBT, Reference subframe position: 2nd |
| 0010 | Cat 4 LBT, Reference subframe position: 3rd |
| 0011 | Cat 4 LBT, Reference subframe position: 4th |
| 0100 | Cat 4 LBT, Reference subframe position: 5th |
| 0101 | Cat 4 LBT, Reference subframe position: 6th |
| 0110 | Cat 4 LBT, Reference subframe position: 7th |
| 0111 | Cat 4 LBT, Reference subframe position: 8th |
| 1000 | Cat 4 LBT, Reference subframe position: 9th |
| 1001 | Cat 4 LBT, Reference subframe position: 10th |
| 1010 | Cat 4 LBT, Reference subframe position: not detected |
| 1011 | 25 usec LBT |
| 1100 | Reserved (or CWS hold) |
| 1101 | Reserved |
| 1110 | Reserved |
| 1111 | Reserved |

And, after a UE performs 25 us LBT, signal transmission of the UE can be permitted at a boundary of a DFD-S-OFDM (Discrete Four Transform-Spread-OFDM) symbol 0 or a DFD-S-OFDM symbol 1. And, signal transmission of the UE can be permitted at a middle point of the DFD-S-OFDM symbol 0 (e.g., 25 us+timing advance value from a start point of the DFD-S-OFDM symbol 0) or a middle point of the last DFT-S-OFDM symbol of a previous subframe (e.g., 25 us from a start point of the last DFT-S-OFDM symbol of a previous subframe). As shown in Table 5, the 16 states of the aforementioned field can be configured in consideration of what is mentioned above.

TABLE 5

| State | Message |
|---|---|
| 0000 | Cat 4 LBT, Reference subframe position: 1st |
| 0001 | Cat 4 LBT, Reference subframe position: 2nd |
| 0010 | Cat 4 LBT, Reference subframe position: 3rd |
| 0011 | Cat 4 LBT, Reference subframe position: 4th |
| 0100 | Cat 4 LBT, Reference subframe position: 5th |
| 0101 | Cat 4 LBT, Reference subframe position: 6th |
| 0110 | Cat 4 LBT, Reference subframe position: 7th |
| 0111 | Cat 4 LBT, Reference subframe position: 8th |
| 1000 | Cat 4 LBT, Reference subframe position: 9th |
| 1001 | Cat 4 LBT, Reference subframe position: 10th |
| 1010 | Cat 4 LBT, Reference subframe position: not detected |
| 1011 | 25 usec LBT, symbol boundary |
| 1100 | 25 usec LBT, within symbol |
| 1101 | Reserved (or CWS hold) |
| 1110 | Reserved |
| 1111 | Reserved |

In Table 5, detail information corresponding to '1011' and '1100' states can be determined in a manner of being combined with information of a field indicating a start symbol (DFT-S-OFDM symbol 0 or DFT-S-OFDM symbol). For example, if the field indicating the start symbol is configured by 1 bit and the field indicates '1', it may assume that the information indicates the DFT-S-OFDM symbol 1.

When 25 us LBT and UL signal transmission performed by a UE are permitted at the middle point of the DFT-S-OFDM symbol 0, if '1100' state of Table 5 is indicated, the UE can perform the UL signal transmission at the middle point of the DFT-S-OFDM symbol 0. And, the UL signal transmission of the UE can be permitted.

If the UE is able to start the UL signal transmission not only at the middle point of the DFT-S-OFDM symbol 0 but also at the middle point of the last DFT-S-PFDM symbol of a previous subframe after 25 us LBT is performed, an eNB can signal a start point of actual UL signal transmission to the UE via 4 combinations shown in Table 6.

TABLE 6

| States of Table 5 | Field indicating start symbol | Actual UL transmission start point |
|---|---|---|
| 1011 | 0 | Start at DFT-S-OFDM symbol 0 |
| 1011 | 1 | Start at DFT-S-OFDM symbol 1 |
| 1100 | 0 | Start at middle point of last DFT-S-OFDM symbol of previous SF |
| 1100 | 1 | Start at middle point of DFT-S-OFDM symbol 0 |

In Tables 4 and 5, maximum 10 subframes can be designated as a reference subframe position. A probability of continuously failing to perform LBT for performing UL signal transmission in preceding B number of subframes (e.g., B=4) is very low among the actually scheduled A number of subframes. Hence, it may be able to set a limit on an eNB to make the eNB inform a UE of maximum C (e.g., C=4) number of reference subframe positions only. In this case, information transmitted by the eNB can be configured to include not only a reference subframe position but also information described in the following using a size of 3 bits.

information indicating that a reference subframe is not discovered information indicating that a CWS value is to be held 25 us LBT information indicating that UL signal transmission starts at symbol boundary or UL signal transmission starts in the middle of symbol The signaling method mentioned earlier in the paragraph 3.6.3 can be identically applied to a signaling method directly indicating a CWS value. Specifically, a channel access priority class, a CWS value, and LBT type information can be jointly encoded. Additionally, it may indicate whether UL signal transmission starts at a symbol boundary or a middle point of a symbol. In case of using a field of 5-bit size, Table 7 illustrates a state configuration of the field. A mapping relation according to each state may vary depending on an implementation example.

TABLE 7

| State | Channel access priority class/CWS/LBT type/UL transmission start position |
|---|---|
| 00000 | 1/3/Cat 4 LBT/NA |
| 00001 | 1/7/Cat 4 LBT/NA |
| 00010 | 2/7/Cat 4 LBT/NA |
| 00011 | 2/15/Cat 4 LBT/NA |
| 00100 | 3/15/Cat 4 LBT/NA |
| 00101 | 3/31/Cat 4 LBT/NA |
| 00110 | 3/63/Cat 4 LBT/NA |
| 00111 | 3/127/Cat 4 LBT/NA |
| 01000 | 3/255/Cat 4 LBT/NA |

TABLE 7-continued

| State | Channel access priority class/CWS/LBT type/UL transmission start position |
|---|---|
| 01001 | 3/511/Cat 4 LBT/NA |
| 01010 | 3/1023/Cat 4 LBT/NA |
| 01011 | 4/15/Cat 4 LBT/NA |
| 01100 | 4/31/Cat 4 LBT/NA |
| 01101 | 4/63/Cat 4 LBT/NA |
| 01110 | 4/127/Cat 4 LBT/NA |
| 01111 | 4/255/Cat 4 LBT/NA |
| 10000 | 4/511/Cat 4 LBT/NA |
| 10001 | 4/1023/Cat 4 LBT/NA |
| 10010 | NA/NA/25 usec LBT/Symbol boundary |
| 10011 | NA/NA/25 usec LBT/Within symbol |
| 10100~ 11111 | Reserved |

If it is unable to start UL signal transmission in the middle of a symbol after 25 us LBT is performed, '10010' and '10011' of Table 7 can be combined in a state. In this case, the state can indicate 25 us LBT only.

In Table 7, detail information corresponding to '10011' and '10011' states can be determined in a manner of being combined with information of a field indicating a start symbol (DFT-S-OFDM symbol 0 or DFT-S-OFDM symbol). For example, if the field indicating the start symbol is configured by 1 bit and the field indicates '0', it indicates that UL transmission starts at the DFT-S-OFDM symbol 0. If the field indicates '1', it indicates that UL transmission starts at the DFT-S-OFDM symbol 1.

When 25 us LBT and UL signal transmission performed by a UE are permitted at the middle point of the DFT-S-OFDM symbol 0, if '10010' state of Table 7 is indicated, the UE can perform the UL signal transmission at the middle point of the DFT-S-OFDM symbol 0. In other word, the UL signal transmission of the UE can be permitted.

If the UE is able to start the UL signal transmission not only at the middle point of the DFT-S-OFDM symbol 0 but also at the middle point of the last DFT-S-PFDM symbol of a previous subframe after 25 us LBT is performed, an eNB can signal a start point of actual UL signal transmission to the UE via 4 combinations shown in Table 8.

TABLE 8

| States of Table 7 | Field indicating start symbol | Actual UL transmission start point |
|---|---|---|
| 10010 | 0 | Start at DFT-S-OFDM symbol 0 |
| 10010 | 1 | Start at DFT-S-OFDM symbol 1 |
| 10011 | 0 | Start at middle point of last DFT-S-OFDM symbol of previous SF |
| 10011 | 1 | Start at middle point of DFT-S-OFDM symbol 0 |

3.6.5 LBT Parameter Update Timing

Timing at which an LBT parameter is updated is explained in the present paragraph. First of all, UL Tx burst is defined in the following. The UL Tx burst can be defined by one of methods described in the following.
- a period during which transmission is continuously attempted in a manner that a UE starts actual transmission after LBT is performed (or after a subframe which is indicated to perform LBT)
- a period during which transmission is continuously attempted irrespective of whether or not LBT is performed (1) An LBT parameter can be updated whenever UL Tx burst ends. This method is preferable when a UE autonomously adjusts an LBT parameter such as a CWS. In this case, success/failure information on a reference subframe of the latest UL Tx burst among previous UL Tx bursts can be utilized for updating the LBT parameter. In this case, the latest UL Tx burst can be restricted to UL Tx bursts capable of using success/failure of the reference subframe among the previous UL Tx bursts.

The success/failure information on the reference subframe can be signaled via a common PDCCH, a PHICH, or a UE-specific PDCCH. Or, the success/failure information on the reference subframe can be signaled according to whether or not NDI of a HARQ process number is toggled.

In addition, the (1) method can also be applied to a case that an eNB adjusts an LBT parameter such as a CWS.

(2) An LBT parameter can be updated when an eNB transmits a UL grant including an LBT parameter. In this case, success/failure information on a reference subframe of the latest UL Tx burst among previous UL Tx bursts appearing before the UL grant is transmitted can be utilized for updating the LBT parameter. In this case, the latest UL Tx burst can be restricted to UL Tx bursts capable of using success/failure of the reference subframe among the previous UL Tx bursts.

(3) An LBT parameter can be updated with a period of a time window of a prescribed size. In this case, success/failure information on a reference subframe within the latest time window can be utilized for updating the LBT parameter among time windows capable of using success/failure for a reference subframe within a previous time window.

3.6.6 Other Things Related to CWS Adjustment

When a DL signal is transmitted via an unlicensed band, if a CWS value for randomly selecting a backoff counter is maintained K times while the CWS value corresponds to the maximum CWS, it may be able to configure CWS values for all channel access priority classes to be reset. In this case, the eNB can select the K from among numbers ranging from 1 to 8.

Yet, since UL data transmission is performed based on the scheduling of the eNB, the configuration above may not be applied to UL signal transmission. In particular, although the maximum CWS is continuously maintained, it may be able to configure the maximum CWS for the UL signal transmission to be continuously maintained. In this case, the K value can be UE-specifically (or UE-commonly) configured via RRC signaling or physical layer signaling (e.g., common PDCCH or PHICH).

In this case, maximum CWS for UL LBT may be less than maximum CWS for DL LBT. Hence, a minimum value of the K can be configured to be greater than 1. And, the K value configured by the eNB may be identical to a K value set to the UE or can be configured to be always greater or less than the K value set to the UE.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

4. Device Configuration

Figure 30:
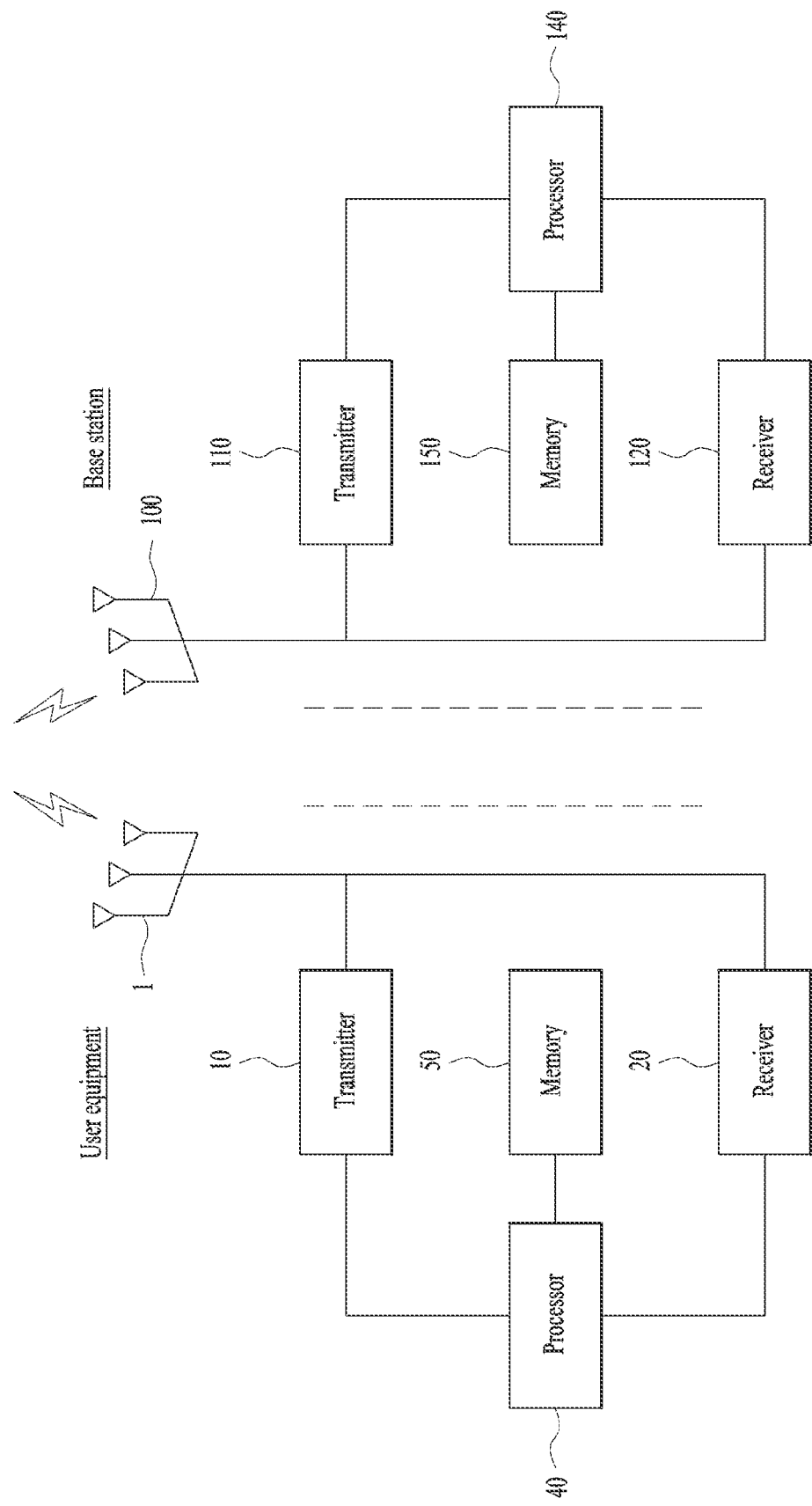
FIG. 30 is a diagram illustrating configurations of a UE and a base station in which proposed embodiments are implementable.

FIG. 30 is a diagram illustrating configurations of a UE and a base station capable of being implemented by the embodiments proposed in the present invention. The UE and the base station shown in FIG. 30 operate to implement the embodiments of a method of transmitting and receiving uplink data and a modulation reference signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 30 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claims is:

1. A method for performing a Listen-Before-Talk (LBT)-based channel access procedure by a user equipment (UE), the method comprising:
   detecting, by the UE, each physical downlink control channel (PDCCH) signal from a base station (BS); and
   performing by the UE, a LBT-based channel access procedure for an uplink transmission based on each PDCCH signal,
   wherein, based on i) the UE detecting a first PDCCH signal, ii) the first PDCCH signal indicating a set of time resources as being within a remaining duration of a BS-initiated channel occupancy time (COT), and iii) after the first PDCCH signal, a subsequent PDCCH signal indicating that the set of the time resources indicated as being within the remaining duration of the BS-initiated COT is not within a subsequent remaining duration of the BS-initiated COT, the method further comprises operations by the UE based on an assumption that:
   the subsequent PDCCH signal indicating the set of the time resources is not within the subsequent remaining duration of the BS-initiated COT, is not detected.

2. The method according to claim 1, wherein the UE considers that the remaining duration of the BS-initiated COT which has been indicated by the first PDCCH signal, is not to be shortened.

3. The method according to claim 1, wherein the each PDCCH signal indicates its remaining duration of the BS-initiated COT based on a time where a corresponding PDCCH signal is detected.

4. The method according to claim 1, wherein the LBT-based channel access procedure is related to a random-backoff-less LBT in which the UE is allowed to perform the uplink transmission after determining that a channel is idle for a predetermined time duration.

5. The method according to claim 4, wherein the predetermined time duration is 25 us.

6. The method according to claim 4, wherein the UE performs a random-backoff-based LBT for an uplink transmission not within any remaining duration of the BS-initiated COT.

7. The method according to claim 1, wherein the UE obtains information regarding at least one of a start and a length of a corresponding remaining duration of the B S-initiated COT from the each PDCCH signal.

8. The method according to claim 1, wherein the BS-initiated COT is based on a result of a LBT-based channel access procedure performed by the BS being determined as idle.

9. The method according to claim 1, wherein the each PDCCH signal is related to multi-UE common signaling.

10. The method according to claim 1, wherein the LBT-based channel access procedure is for performing the uplink transmission on an unlicensed band.

11. The method according to claim 1, wherein each remaining duration of the BS-initiated COT is a time duration of the BS-initiated COT not used by the BS for a downlink transmission.

12. The method according to claim 11, wherein each remaining duration of the B S-initiated COT is related to an early completion of the downlink transmission before an end of the BS-initiated COT.

13. A non-transitory medium readable by a processor and recorded thereon instructions cause the processor to perform the method according to claim 1.

14. A device for processing a signal for wireless communication, the device configured as a user equipment (UE) and comprising:
  a memory configured to store instructions; and
  a processor configured to perform operations by executing the instructions, the operations comprising:
  detecting by the UE, each physical downlink control channel (PDCCH) signal from a base station (BS); and
  performing by the UE, a Listen-Before-Talk (LBT)-based channel access procedure for an uplink transmission based on each PDCCH signal, wherein, based on i) the UE detecting a first PDCCH signal, ii) the first PDCCH signal indicating a set of time resources as being within a remaining duration of a BS-initiated channel occupancy time (COT), and iii) after the first PDCCH signal, a subsequent PDCCH signal indicating that the set of the time resources indicated as being within the remaining duration of the BS-initiated COT is not within a subsequent remaining duration of the BS-initiated COT, the method further comprises operations by the UE based on an assumption that:
  the subsequent PDCCH signal indicating the set of the time resources is not within the subsequent remaining duration of the BS-initiated COT, is not detected.

15. The device according to claim 14, further comprising:
  a transceiver, and wherein the device is a user equipment (UE) configured to perform 3rd generation partnership project (3GPP)-based wireless communication.

16. The device according to claim 15, wherein the device is an application specific integrated circuit (ASIC) or a digital signal processing device.

17. A method for performing a Listen-Before-Talk (LBT)-based channel access procedure by a base station (BS), the method comprising:
  performing, in a BS-initiated channel occupancy time (COT), a downlink transmission based on a LBT-based channel access procedure; and
  transmitting each physical downlink control channel (PDCCH) signal,
  wherein, based on i) the BS transmitting a first PDCCH signal, ii) the first PDCCH signal indicating a set of time resources as being within a remaining duration of a BS-initiated channel occupancy time (COT), and iii) the BS being configured to transmit a subsequent PDCCH signal indicating a subsequent remaining duration of the BS-initiated COT after the first PDCCH signal, the BS determines that:
  the subsequent PDCCH signal is not going to indicate that the set of the tim e resources indicated as being within the remaining duration of the BS-initiated COT is not within the subsequent remaining duration of the BS-initiated COT.

18. A base station (BS) comprising:
  a transceiver; and
  a memory configured to store instructions; and
  a processor configured to perform operations by executing the instructions, the operations comprising:
  performing, in a BS-initiated channel occupancy time (COT), a downlink transmission based on a Listen-Before-Talk (LBT)-based channel access procedure; and
  transmitting each physical downlink control channel (PDCCH) signal,
  wherein, based on i) the BS transmitting a first PDCCH signal, ii) the first PDCCH signal indicating a set of time resource as being within a remaining duration of a BS-initiated channel occupancy time (COT), and iii) the BS being configured to transmit a subsequent PDCCH signal indicating a subsequent remaining duration of the BS-initiated COT after the first PDCCH signal, the BS determines that:
  the subsequent PDCCH signal is not going to indicate that the set of the time resources indicated as being within the remaining duration of the BS-initiated COT is not within the subsequent remaining duration of the BS-initiated COT.

19. A method for performing a Listen-Before-Talk (LBT)-based channel access procedure by a user equipment (UE), the method comprising:
  detecting, by the UE, each physical downlink control channel (PDCCH) signal from a base station (BS); and
  performing, by the UE, a LBT-based channel access procedure for an uplink transmission based on the each PDCCH signal,
  wherein, based on i) the UE detecting a first PDCCH signal ii) the first PDCCH signal indicating a set of time resources as being within a remaining duration of a BS-initiated channel occupancy time (COT), and iii) the UE being configured to detect a subsequent PDCCH signal indicating a subsequent remaining duration of the BS-initiated COT after the first PDCCH signal, the UE determines that:
  the subsequent PDCCH signal is not going to indicate that the set of the time resources indicated as being within the remaining duration of the BS-initiated is not within the subsequent remaining duration of the BS-initiated COT.

* * * * *